(12) United States Patent
Nagai

(10) Patent No.: US 11,231,887 B2
(45) Date of Patent: Jan. 25, 2022

(54) IMAGE FORMING APPARATUS, INFORMATION PROCESSING METHOD, AND NON-TRANSITORY STORAGE MEDIUM STORING INFORMATION PROCESSING PROGRAM

(71) Applicant: SHARP KABUSHIKI KAISHA, Sakai (JP)

(72) Inventor: Yuhsuke Nagai, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/890,549

(22) Filed: Jun. 2, 2020

(65) Prior Publication Data

US 2020/0409618 A1 Dec. 31, 2020

(30) Foreign Application Priority Data

Jun. 25, 2019 (JP) .............................. JP2019-117689

(51) Int. Cl.
*G06F 3/12* (2006.01)
*H04N 1/00* (2006.01)

(52) U.S. Cl.
CPC ............ *G06F 3/1208* (2013.01); *G06F 3/121* (2013.01); *G06F 3/1256* (2013.01); *G06F 3/1292* (2013.01); *H04N 1/00233* (2013.01); *G06F 3/12* (2013.01); *G06F 3/1204* (2013.01)

(58) Field of Classification Search
CPC .... G06F 3/1208; G06F 3/1292; G06F 3/1256; G06F 3/121; G06F 3/1285; G06F 3/1244; G06F 3/125; G06F 3/1253; G06F 3/12; G06F 3/1204; H04N 1/00233; G06K 9/2054; G06K 9/344
USPC ........................................................ 358/1.15
See application file for complete search history.

(56) References Cited

U.S. PATENT DOCUMENTS

| 2011/0043652 A1* | 2/2011 | King ..................... G06F 40/194 348/222.1 |
| 2015/0254032 A1 | 9/2015 | Sugahara |
| 2016/0162478 A1* | 6/2016 | Blassin ............ G06Q 10/06311 706/12 |

FOREIGN PATENT DOCUMENTS

JP  2015-171098 A  9/2015

* cited by examiner

*Primary Examiner* — Miya J Williams
*Assistant Examiner* — Darryl V Dottin
(74) *Attorney, Agent, or Firm* — ScienBiziP, P.C.

(57) ABSTRACT

An image forming apparatus includes a CPU, and receives print information transmitted from an information processing device via a network. The image forming apparatus generates an output image according to the print information, and if a non-matching character which a user recognizes with difficulty is included in the output image, generates a corrected image in which all or a part of the non-matching character is corrected.

9 Claims, 23 Drawing Sheets

FIG. 6A

Number V

FIG. 6B

Number V

FIG. 6C

Number V

IMAGE FORMING APPARATUS, INFORMATION PROCESSING METHOD, AND NON-TRANSITORY STORAGE MEDIUM STORING INFORMATION PROCESSING PROGRAM

BACKGROUND OF THE INVENTION

Field of the Invention

The present invention relates to an image forming apparatus, an information processing method, and an information processing program, and more particularly to, for example, an image forming apparatus capable of adjusting the thickness of printed characters, an information processing method therefor, and an information processing program therefor.

Description of the Background Art

An example of such type of an image forming apparatus according to the background art is disclosed in Japanese Unexamined Patent Application Publication No. 2015-171098 (hereinafter, referred to as Patent Document 1). In the technique disclosed in Patent Document 1, it is determined whether a character printed on a sheet is an outline character, and if the character is not an outline character, a process of reducing the thickness of the character is performed. If it is determined that the character is an outline character, a process of increasing the thickness of the character is performed.

However, in the image forming apparatus according to the background art, the thickness of all characters printed on the sheet is changed. Therefore, if the thickness of the characters is increased, some of the characters may be illegible. Further, if the thickness of the characters is reduced, some of the characters may be erased. As a result, a printed matter in which characters are not easily recognized may possibly be output.

Therefore, a main object of the present invention is to provide a novel image forming apparatus, information processing method, and information processing program.

Another object of the present invention is to provide an image forming apparatus capable of preventing, from being output, a printed matter in which characters are not easily recognized, an information processing method therefor, and an information processing program therefor.

SUMMARY OF THE INVENTION

A first invention is an image forming apparatus including a receiver that receives print information being transmitted from an external information processing device and including information on an electronic document including a plurality of characters; a first image generator that generates an output image from the print information received by the receiver; a first extractor that extracts, from the print information, a first character code group including a plurality of character codes for each of a plurality of characters included in the print information; a second extractor that extracts, from the output image, a second character code group including a plurality of character codes for each of a plurality of characters included in the output image; a first match determiner that determines whether the first character code group matches the second character code group; a third extractor that, if the first character code group does not match the second character code group, extracts a non-matching character code group including a non-matching character code included in the first character code group; a corrected image generator that, when the non-matching character code group is extracted, generates a corrected image in which a non-matching character corresponding to the non-matching character code is corrected based on the output image; and an image former that prints the output image or the corrected image on a recording medium.

In a second invention according to the first invention, the print information includes quality operation information on operation conditions affecting a finish of characters printed on the recording medium, the image forming apparatus further includes a correction condition determiner that, if the first character code group does not match the second character code group, determines whether a predetermined correction condition is satisfied according to the quality operation information, and the corrected image generator generates the corrected image if the correction condition is satisfied.

In a third invention according to the second invention, the output image includes a first output image generated from the print information, and a second output image generated based on the first output image, and the image forming apparatus further includes a first storage that, in the correction of the non-matching character, stores first learning information including a processed character code being a non-matching character code processed in the past; a first processed character determiner that, when the first character code group is extracted, determines whether the first character code group includes the processed character code; a non-matching condition determiner that, when the first character code group includes the processed character code, determines whether a condition where the character corresponding to the processed character code could be the non-matching character is satisfied; and a third image generator that, if the condition where the character corresponding to the processed character code could be the non-matching character is satisfied according to the non-matching condition determiner, generates the second output image. The second extractor extracts a second character code group from the second output image when the second output image is generated, and the image former prints any one of the first output image, the second output image, and the corrected image on the recording medium.

A fourth invention according to the third invention is the image forming apparatus further including a fourth extractor that extracts a third character code group from the corrected image; a second match determiner that determines whether the first character code group matches the third character code group; and a first information generator that, if the first character code group matches the third character code group, generates the first learning information.

A fifth invention according to the fourth invention is the image forming apparatus including a second processed character determiner that, if the first character code group does not match the third character code group, determines whether the non-matching character code group includes the processed character code; and the first information generator that, if the non-matching character code group includes the processed character code, generates the first learning information.

A sixth invention according to the second invention is the image forming apparatus including a fourth extractor that extracts a third character code group from the corrected image; a second match determiner that determines whether the first character code group matches the third character code group; an unprocessed character determiner that determines whether the non-matching character code included in the non-matching character code group is an unprocessed character code being a non-matching character code not processed if the first character code group does not match the third character code group; a second information generator that, if the non-matching character code included in the non-matching character code group is determined to be the unprocessed character code, generates second learning information; and a transmitter that transmits the second learning information to the outside.

In a seventh invention according to the sixth invention, the second information generator generates second learning information corresponding to the non-matching character code group if the correction condition is not satisfied.

An eighth invention is a non-transitory storage medium for storing an information processing program executed by an image forming apparatus including a receiver that receives print information being transmitted from an external information processing device and including information on an electronic document including a plurality of characters, and an image former that prints an output image or a corrected image on a recording medium, the information processing program for causing a processor of the image forming apparatus to execute: generating the output image as a first image generation from the print information received by the receiver; extracting, from the print information, a first character code group including a plurality of character codes for each of a plurality of characters included in the print information; extracting, from the output image, a second character code group including a plurality of character codes for each of a plurality of characters included in the output image; determining whether the first character code group matches the second character code group; extracting, if the first character code group does not match the second character code group, a non-matching character code group including a non-matching character code included in the first character code group; and generating, when the non-matching character code group is extracted, a corrected image in which a non-matching character corresponding to the non-matching character code is corrected based on the output image.

A ninth invention is a method of processing information by an image forming apparatus including a receiver that receives print information being transmitted from an external information processing device and including information on an electronic document including a plurality of characters, and an image former that prints an output image or a corrected image on a recording medium, and the method includes: (a) generating the output image as a first image generation from the print information received by the receiver; (b) extracting, from the print information, a first character code group including a plurality of character codes for each of a plurality of characters included in the print information; (c) extracting, from the output image, a second character code group including a plurality of character codes for each of a plurality of characters included in the output image; (d) determining whether the first character code group matches the second character code group; (e) extracting, if the first character code group does not match the second character code group, a non-matching character code group including a non-matching character code included in the first character code group; and (f) generating, when the non-matching character code group is extracted, a corrected image in which a non-matching character corresponding to the non-matching character code is corrected based on the output image.

According to the present invention, non-matching characters which a user recognizes with difficulty are corrected, and thus, it is possible to suppress the occurrence of non-matching characters.

The above object, other objects, features, and advantages of the present invention will be more apparent from the following detailed description of embodiments with reference to the drawings.

BRIEF DESCRIPTION OF THE DRAWINGS

FIGS. 6A to 6F are diagrams illustrating examples of a part of an output image;

DESCRIPTION OF THE PREFERRED EMBODIMENTS

First Embodiment

Figure 1:
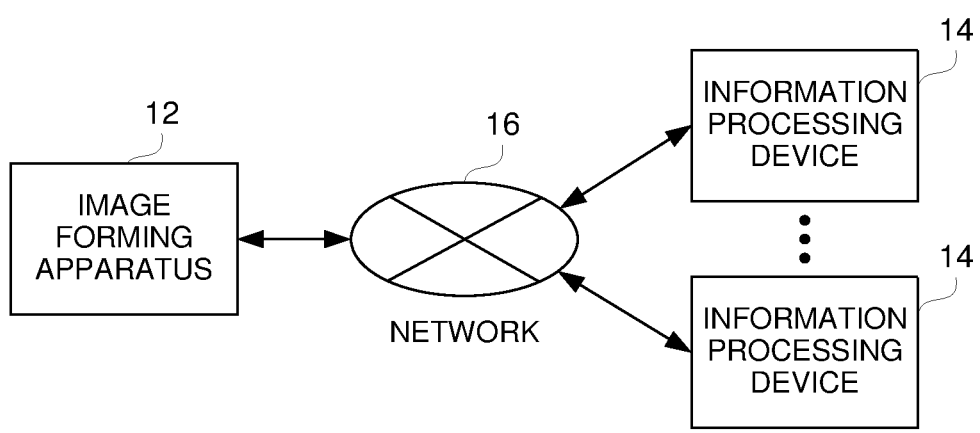
FIG. 1 is a diagram illustrating an example of a configuration of an information processing system according to the present invention.

FIG. 1 is a block diagram illustrating an example of a configuration of an information processing system 10 according to a first embodiment. As illustrated in FIG. 1, the information processing system 10 according to the present embodiment includes an image forming apparatus 12 and a plurality of information processing devices 14.

The image forming apparatus 12 and the information processing devices 14 are communicably connected via a network indirectly or directly by wireless communication or the like. The image forming apparatus 12 and the information processing devices 14 are connected via a network 16 in the first embodiment. The network 16 is not particularly limited and may be any network such as the Internet and a LAN.

Although the example of the information processing system 10 illustrated in FIG. 1 illustrates a case where one image forming apparatus 12 is connected to the network 16, two or more image forming apparatuses 12 may be connected.

The information processing device 14 in the first embodiment corresponds to a mobile phone (including a device called a smartphone), a mobile personal computer (PC), a desktop PC, and the information processing device 14 having functions similar to those described above.

The information processing device 14 has a function of a word processor (a text creation function) capable of inputting, editing, printing, and browsing a text.

Figure 2:
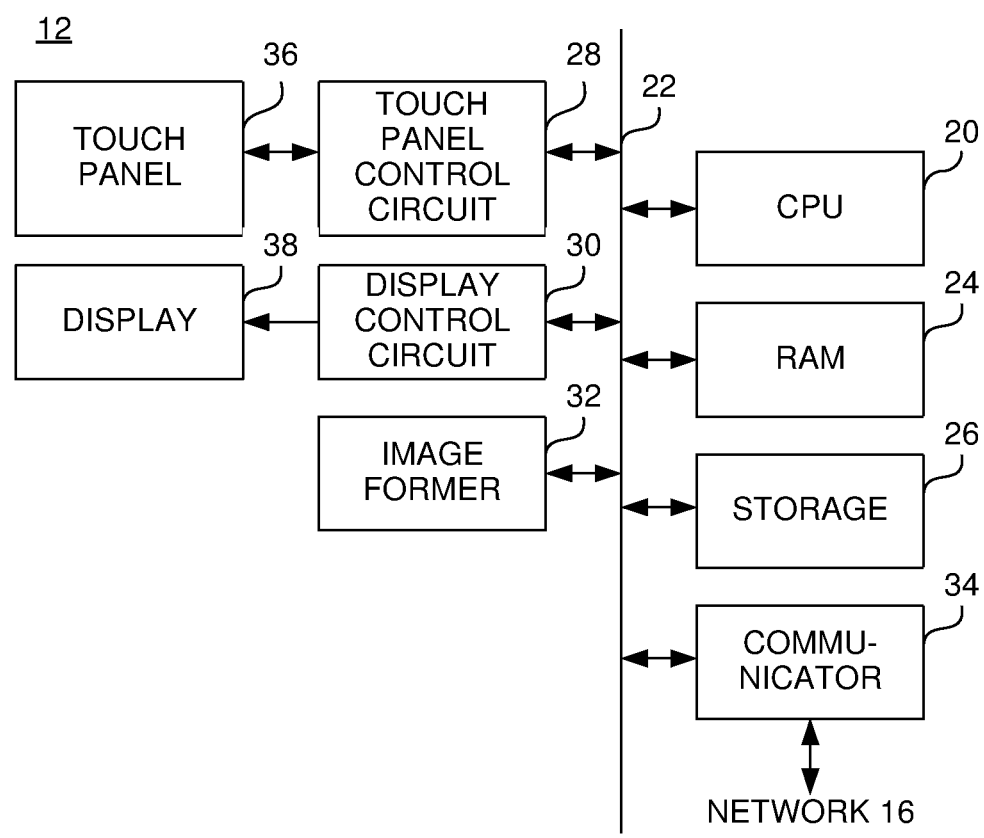
FIG. 2 is a block diagram illustrating an electrical configuration of an image forming apparatus.

FIG. 2 is a block diagram illustrating an electrical configuration of the image forming apparatus 12 illustrated in FIG. 1. The image forming apparatus 12 includes a CPU 20, and the CPU 20 is connected to a RAM 24, a storage 26, a touch panel control circuit 28, a display control circuit 30, an image former 32, and a communicator 34 via a bus 22. The touch panel control circuit 28 is connected to a touch panel 36, and the display control circuit 30 is connected to a display 38.

The CPU 20 manages the overall control of the image forming apparatus 12. The RAM 24 is used as a work area and a buffer area of the CPU 20.

The storage 26 is the main storage device of the image forming apparatus 12, and employs a nonvolatile memory such as an HDD and an EEPROM. The storage 26 may include the RAM 24. The storage 26 stores data for a control program for controlling operations of components of the image forming apparatus 12 by the CPU 20, images (display images) data for various screens, data necessary for executing the control program, and the like.

The touch panel control circuit 28 applies a voltage or the like necessary for the touch panel 36, detects a touch operation or a touch input within an effective touch range of the touch panel 36, and outputs, to the CPU 20, the touch coordinate data indicating the position of the touch input.

The touch panel 36 is a general-purpose touch panel, and may employ any type of touch panel such as an electrostatic capacitance type, an electromagnetic induction type, a resistance film type, and an infrared type. In the present embodiment, an electrostatic capacitance type touch panel is employed for the touch panel 36, and the touch panel 36 is provided on the display surface of the display 38. However, a touch panel display in which the touch panel 36 and the display 38 are integrally formed may be employed.

The display control circuit 30 includes a GPU, a VRAM, and the like. The GPU, under an instruction from the CPU 20, generates, in the VRAM, display image data for displaying various screens on the display 38 using a first image generation data 204b (see FIG. 8) stored in the RAM 24, and outputs the generated display image data to the display 38. For example, an LCD or an electro-luminescence (EL) display can be employed for the display 38.

The image former 32 includes a photoconductive drum, a charging device, an exposure device, a developing device, a transfer device, a fixing device, and the like, and forms an image (print image) to be printed on a recording medium (such as a sheet and an OHP film), on the recording medium (hereinafter, may be simply referred to as "sheet") using a dry electrophotographic method.

Further, the image former 32 has a color printing function, and an image forming station including a photoconductive drum, a charging device, a developing device, and the like is formed for each of Y (yellow), M (magenta), C (cyan), and K (black).

The communicator 34 is an interface for communicating with an external computer such as the information processing device 14 via the network 16 described above. The specific configuration of the communicator 34 is not particularly limited. The communicator 34 may be a wired communication circuit for transmitting and receiving data based on a wired communication system conforming to a communication standard such as Ethernet (registered trademark), may be a wireless communication circuit for transmitting and receiving data according to a communication standard such as IEEE 802.11, or may be a communication circuit based on another well-known communication method. The same applies to a communicator 62 described below.

Figure 3:
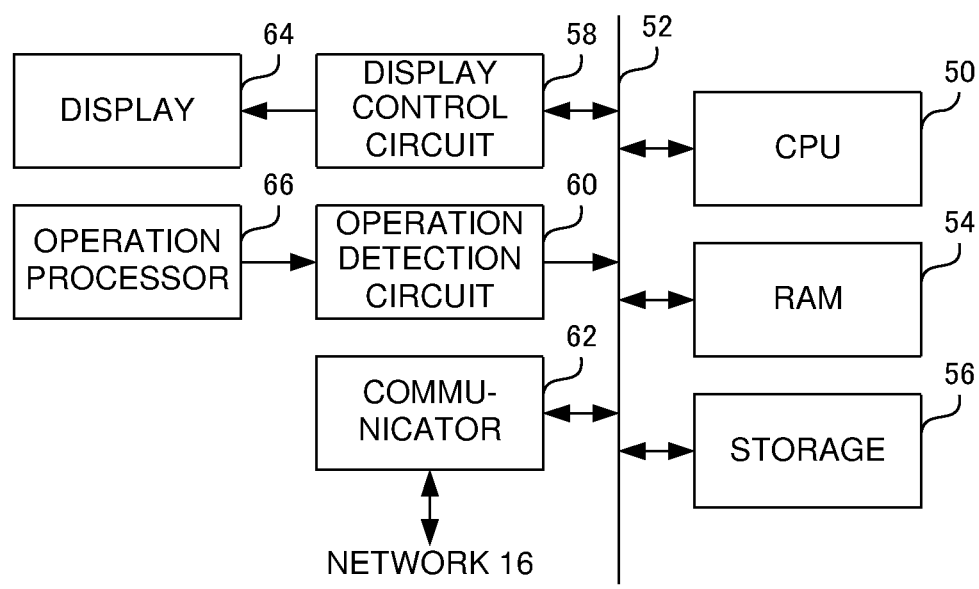
FIG. 3 is a block diagram illustrating an electrical configuration of an information processing device.

FIG. 3 is a block diagram illustrating an electrical configuration of the information processing device 14 illustrated in FIG. 1. The information processing device 14 includes a CPU 50, and the CPU 50 is connected to a RAM 54, a storage 56, a display control circuit 58, an operation detection circuit 60, and the communicator 62 via a bus 52. Further, the display control circuit 58 is connected to a display 64, and the operation detection circuit 60 is connected to an operation processor 66.

The CPU 50 manages the overall control of the information processing device 14. The RAM 54 is used as a work area and a buffer area of the CPU 50.

The storage 56 is the main storage device of the information processing device 14, and employs a nonvolatile memory such as an HDD and an EEPROM. Further, the storage 56 may be configured to include the RAM 54. The storage 56 appropriately stores a control program for controlling operations of components of the information processing device 14 by the CPU 50, data necessary for executing the control program, display image data for various screens, printer drivers, and the like. Further, the storage 56 may store data for the software or application for exhibiting a text creation function.

The display control circuit 58 includes a GPU, a VRAM, and the like. The GPU, under an instruction from the CPU 50, generates, in the VRAM, display image data for displaying various screens on the display 64 using a second image generation data 304b (see FIG. 9) stored in the RAM 54, and outputs the generated display image data to the display 64.

For example, an LCD or an EL display can be employed for the display 64. The display 64 displays screens such as a print execution screen 100 (see FIG. 4) and a driver setting screen (see FIG. 5), described below. In addition, software-reproduced keys (icons) are displayed on these screens.

The operation detection circuit 60 outputs, to the CPU 50, a signal or operation data corresponding to an input operation (user operation) on the operation processor 66. Examples of the operation processor 66 include a mouse, a keyboard, and a touch panel. If a touch panel is employed as the operation processor 66, the touch panel is provided on the display surface of the display 64. Further, a touch panel display in which the display 64 and the operation processor 66 are integrated may be employed.

The communicator 62 is an interface for communicating with the image forming apparatus 12 via the network 16.

The electrical configuration of the information processing device 14 illustrated in FIG. 3 is merely an example, and is not limiting.

In the information processing system 10 configured as described above, a document (electronic document) generated or edited by the information processing device 14 can be printed by the image forming apparatus 12. Specifically, in response to an instruction by a user, print information including information about the electronic document is transmitted from the information processing device 14 to the image forming apparatus 12 via the network 16. Upon receiving the print information, the image forming apparatus 12 starts printing according to the print information. The print information includes operation information and image configuration information.

The operation information is information on operation conditions of the image forming apparatus 12. The operation information includes information (quality operation information) on operation conditions (quality operation conditions) affecting the finish of characters on a printed matter, and information (other operation information) on other operation conditions (other operation conditions).

Examples of the quality operation conditions include a thickness of the character, a page aggregation, a document size, a magnification, and an output sheet size.

The thickness of the character refers to the thickness of a character included in a print image, that is, the thickness of a printed character. The setting of the thickness of the character specifies whether to not change, or to reduce or increase the thickness in a default setting. That is, if the setting of the thickness of the character is changed, the thickness of the printed character changes. If the thickness of the printed character is increased, the number of dots forming the character increases, and if the thickness of the printed character is reduced, the number of dots forming the character reduces. At this time, the position and size of the character do not change.

The page aggregation refers to a printing setting in which a plurality of pages of an electronic document are aggregated on one sheet. The setting of page aggregation specifies the number of pages of an electronic document on one sheet, that is, the number of pages of the electronic document included in the print image for one page. For example, the arrangement of characters on a printed sheet is different between a case where the pages aggregation is set to 1 (so-called 1 in 1) and a case where the page aggregation is set to 2 (so-called 2 in 1). Therefore, the arrangement of the characters may change in accordance with a change of the page aggregation setting.

The document size refers to the size of an electronic document, that is, the size of a print image. Examples of the document size include A4, A3, B5, and postcard sizes. The same applies to the output sheet size described below.

The magnification refers to a ratio indicating how many times the size of the image actually printed on the sheet is larger or smaller than the original size of the print image. The magnification is 100% if the size of the image actually printed on the sheet and the original size of the print image are the same. For example, the magnification is set within a range of 25% to 400%.

The output sheet size refers to the size of the output sheet, that is, the size of the sheet on which the print image is printed. The output sheet size may be set to the same size as the document size, or may be set to a size different from the document size. However, if the output sheet size is set to a size different from the document size, the magnification setting changes automatically according to the ratio of the output sheet size to the document size.

Examples of the other operation condition include the number of print copies and the page range. The number of print copies refers to the number of printed matters corresponding to the entire print image. The number of print copies is set to 1 or a higher number. The page range refers to the range of pages to be printed in the electronic document. If the electronic document includes a plurality of pages, the page range is set to a page, all pages, or pages in any range.

The image configuration information includes information on an electronic document created using the text creation function. The image configuration information is described in a predetermined page description language. If a plurality of images are generated based on the image configuration information, all of the images correspond to output images.

The image configuration information includes a character code, an identifier for identifying a font (font identifier), information on the point size of a character, information on the arrangement of characters, information corresponding to a photograph (image information), and information on the arrangement of the photograph.

Information included in the image configuration information changes according to a type of electronic document and settings for the quality operation condition.

Examples of the electronic document include an electronic document containing a character element (an electronic document containing characters) and an electronic document not containing a character element (an electronic document not containing characters). In the electronic document containing characters, information such as the character code and the font identifier is included in the image configuration information. On the other hand, in the electronic document not containing characters, the image configuration information does not include information on the character code and the font identifier.

For an example of the quality operation conditions, the direction and the location of the character printed on the sheet change according to the setting of page aggregation. Therefore, information on the arrangement of characters included in the image configuration information differs depending on the setting of page aggregation.

Hereinafter, a series of operations of the information processing system 10 until the print information is transmitted to the image forming apparatus 12 will be described.

Figure 4:
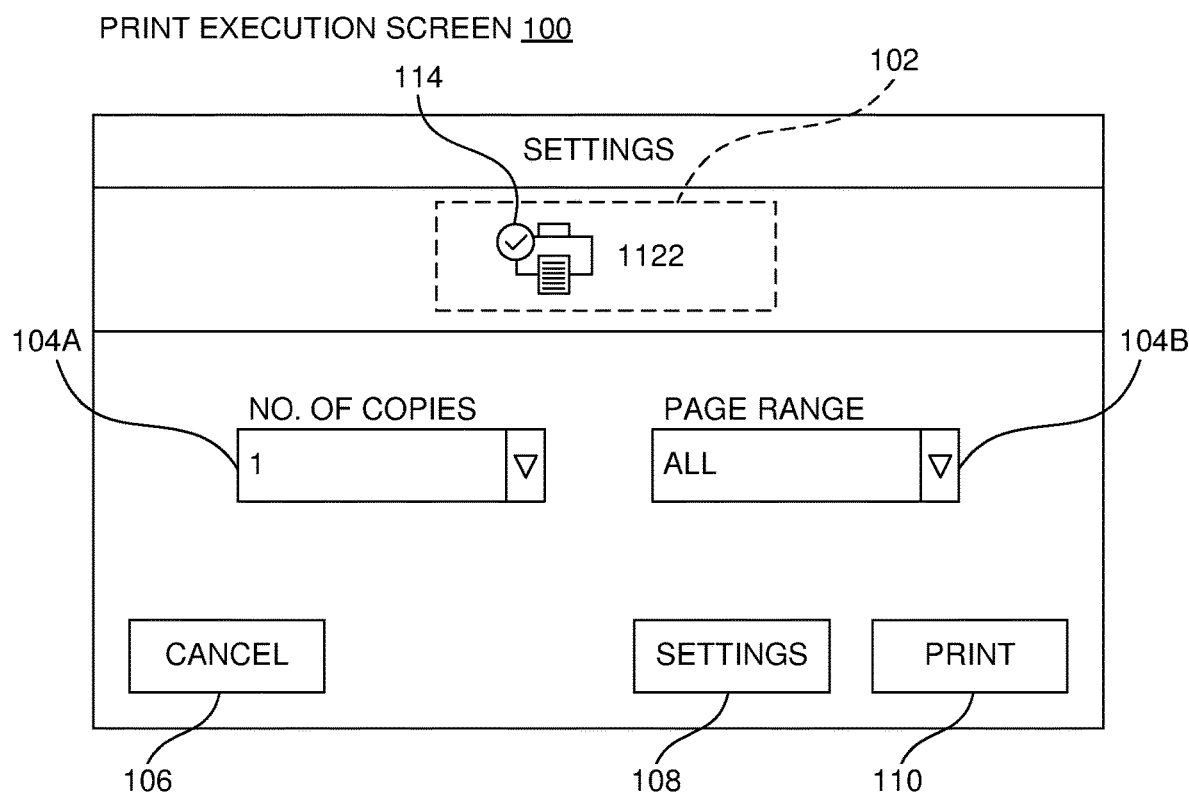
FIG. 4 is a diagram illustrating an example of a print execution screen displayed on a display of the information processing device.

Although not illustrated, in the information processing device 14 according to the first embodiment, in a state where the text creation function has been enabled, for example, if a predetermined user operation for outputting an electronic document is received, the print execution screen 100 as illustrated in FIG. 4 is displayed on the display 64.

The print execution screen 100 is a screen for transmitting print information to a predetermined destination, and is also a screen for setting some operation conditions. In the example illustrated in FIG. 4, the print execution screen 100 is also a screen for setting other operation conditions. The print execution screen 100 illustrated in FIG. 4 indicates the print execution screen 100 in a default state.

An icon 102, a selection icon 104 (104a, 104b), a cancel icon 106, a setting icon 108, and a print icon 110 are provided in the print execution screen 100. Further, an index image 114 indicating the transmission destination of the print information is displayed to overlap with the icon 102.

The icon 102 is provided for setting the transmission destination of the print information. The transmission destination of the print information is set to, for example, the image forming apparatus 12 with which the information processing device 14 communicates via the network 16. In the example illustrated in FIG. 4, the image forming apparatus 12 to which the name "1122" is assigned is set as the transmission destination of the print information.

The selection icon 104a is provided for setting the number of print copies. If the selection icon 104a is operated, a pull-down menu, a screen, or the like (not illustrated) for setting the number of print copies is displayed on the display 64, so that the number of print copies is set according to a user operation (setting operation) for setting the operation conditions. In the example illustrated in FIG. 4, the number of print copies is set to "1". If a predetermined selection icon is operated, a pull-down menu or a screen for setting the operation condition assigned to the selection icon is displayed on the display 64. The same also applies to the selection icon 104b and a plurality of selection icons 122 (122a to 122e) illustrated in FIG. 5.

The selection icon 104b is provided for setting a page range. In the example illustrated in FIG. 4, the page range is set to "All". That is, the entire range of the electronic document is set as the printing range.

The cancel icon 106 is provided for canceling transmission of print information. If the cancel icon 106 is operated, the print execution screen 100 is hidden.

In the present embodiment, the operation condition is returned to the default state in response to an operation on the cancel icon 106. The same applies to a case where print information is transmitted to the image forming apparatus 12 in response to an operation on the print icon 110 described below.

The setting icon 108 is provided for setting an operation condition other than the other operation conditions. Specifically, the setting icon 108 is provided for setting the quality operation conditions. If the setting icon 108 is operated, a driver setting screen 120 described below is displayed on the display 64.

The print icon 110 is provided for transmitting print information (issuing a print instruction) to a predetermined transmission destination. If the print icon 110 is operated, print information is generated based on the electronic document and the operation conditions of the image forming apparatus 12 set by the information processing device 14, and the print information is transmitted to a predetermined transmission destination. Specifically, the image configuration information is generated based on the electronic document and the quality operation conditions, and the operation information is generated based on the electronic document and the operation conditions.

Figure 5:
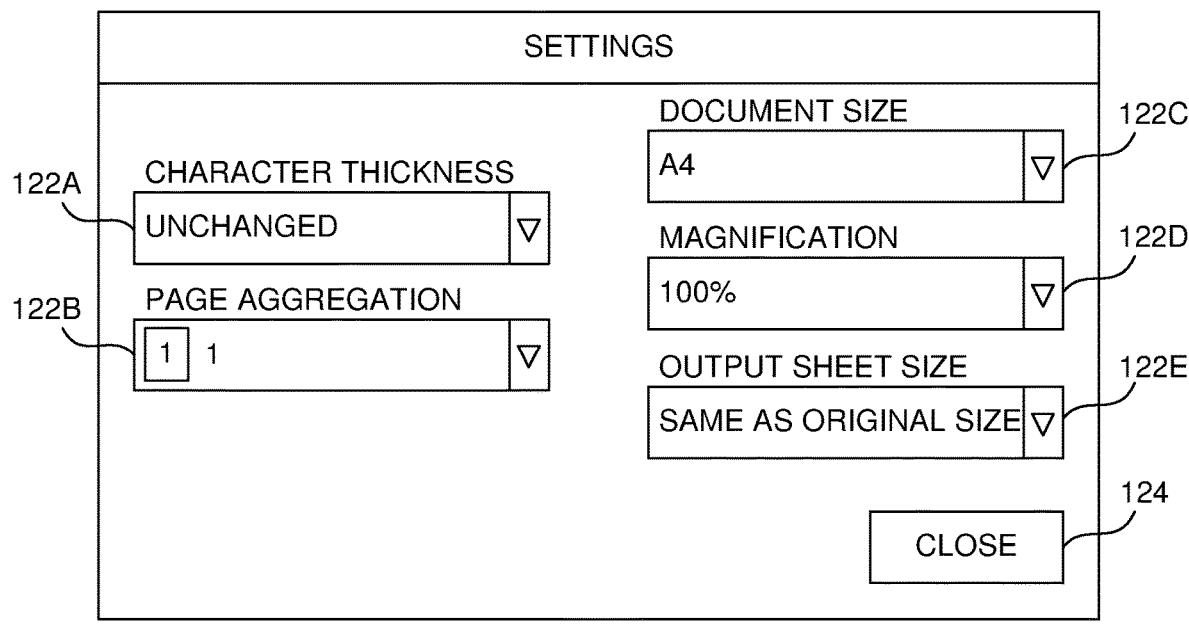
FIG. 5 is a diagram illustrating an example of a driver setting screen displayed on the display of the information processing device.

FIG. 5 is a diagram illustrating an example of the driver setting screen 120 displayed on the display 64. The driver setting screen 120 is a screen for setting the quality operation conditions. The driver setting screen 120 indicates the driver setting screen 120 in a default state.

The driver setting screen 120 is provided with the plurality of selection icons 122 (122a to 122e) and a close icon 124.

The first selection icon 122a is provided for setting the thickness of the character. In the example illustrated in FIG. 5, the thickness of the character is set to "Unchanged".

The second selection icon 122b is provided for setting page aggregation. In the example illustrated in FIG. 5, the page aggregation is set to "1".

The third selection icon 122c is provided for setting a document size. In the example illustrated in FIG. 5, the document size is set to "A4".

The fourth selection icon 122d is provided for setting a magnification. In the example illustrated in FIG. 5, the magnification is set to "100%".

The fifth selection icon 122e is provided for setting an output sheet size. In the example illustrated in FIG. 5, the output sheet size is set to "same as original size". That is, the output sheet size is set to the same size as the document size.

The close icon 124 is provided for ending the setting of the quality operation conditions. If the close icon 124 is operated, the driver setting screen 120 is hidden from the display 64. If the driver setting screen 120 is hidden from the display 64, the print execution screen 100 is displayed on the display 64.

As described above, the magnification is a ratio indicating how many times the size of the image actually printed on a sheet is larger or smaller than the original size of the print image. Therefore, if the page aggregation is first set to 2 or more, the magnification cannot be set to any magnification. If the magnification is first set to a value other than 100%, the page aggregation setting is fixed at 1.

In addition, when the print icon 110 is operated, if the output sheet size is set to a size smaller than the document size, the document size is set in the same manner as the output sheet size.

Upon receiving print information transmitted from the information processing device 14, the image forming apparatus 12 according to the first embodiment having at least a print function generates an output image being the original of a print image in accordance with the image configuration information (information about the electronic document) included in the print information. Further, the image forming apparatus 12 operates according to operation conditions corresponding to operation information included in the print information.

The image forming apparatus 12 according to the first embodiment has an automatic correction function. The image forming apparatus 12 having the automatic correction function determines whether the output image includes a character which a user recognizes with difficulty because of illegibility of the characters and blurring of a part of the character. If the image forming apparatus 12 determines that the output image includes a character which the user recognizes with difficulty, the image forming apparatus 12 automatically corrects the character. Hereinafter, a series of processes from reception of print information to output of a printed matter will be described.

Further, when the output image is generated, the image forming apparatus 12 determines whether a character is included in the output image. This is determined based on whether a character code is included in the image configuration information.

If the output image includes a character, a character code group including all character codes included in the image configuration information is extracted. Hereinafter, a character code group directly extracted from the image configuration information is referred to as a first character code group.

If the first character code group is extracted from the image configuration information, a character code group including all the character codes is extracted from the output image using an optical character recognition (OCR) function.

Hereinafter, the character code group extracted from the print image is referred to as a second character code group. Specifically, all characters included in the output image are recognized according to the OCR function, and character codes corresponding to the recognized characters are obtained. Since the method of extracting a character code using the OCR function is well-known, a detailed description is omitted.

If the second character code group is extracted, it is determined whether the first character code group matches the second character code group. The first character code group and the second character code group are compared, and among the character codes included in the first character code group, a character code that does not match the character code included in the second character code group is referred to as a non-matching character code. If the first character code group and the second character code group do not match, a non-matching character code group including all non-matching character codes is extracted from the first character code group.

The second character code group is extracted from the output image according to the OCR function, and therefore, if a non-matching character code occurs, the character corresponding to the non-matching character code corresponds to a non-matching character. Therefore, in the image forming apparatus 12 according to the first embodiment, if a non-matching character code occurs, it is determined that the output image includes a non-matching character. The non-matching character is a character not correctly extracted by the OCR function, and would correspond to a character which a user recognizes with difficulty.

In the first embodiment, if the first character code group and the second character code group do not match, the operation information is referenced, and if a predetermined correction condition is satisfied, an image (corrected image) is generated in which the non-matching character included in the output image is corrected according to the non-matching character code group.

The correction condition is a condition for correcting a non-matching character, and in the first embodiment, examples of the correction condition include a first correction condition, a second correction condition, and a third correction condition.

The first correction condition is satisfied by setting at least the thickness of the character to "Reduce".

The second correction condition is satisfied by setting at least the thickness of the character to "Increase".

The third correction condition is a condition (bold character condition) under which a character is illegible regardless of the setting of the thickness of the character. For example, if the document size or the output sheet size is small with respect to the number of characters included in one page, if the page aggregation is set to a predetermined number (for example, 8) or more, if the magnification is set to 50% or less, and if the output sheet size is set to about one-tenth the document size, the third correction condition is satisfied.

Figures 6A, 6B, 6C:
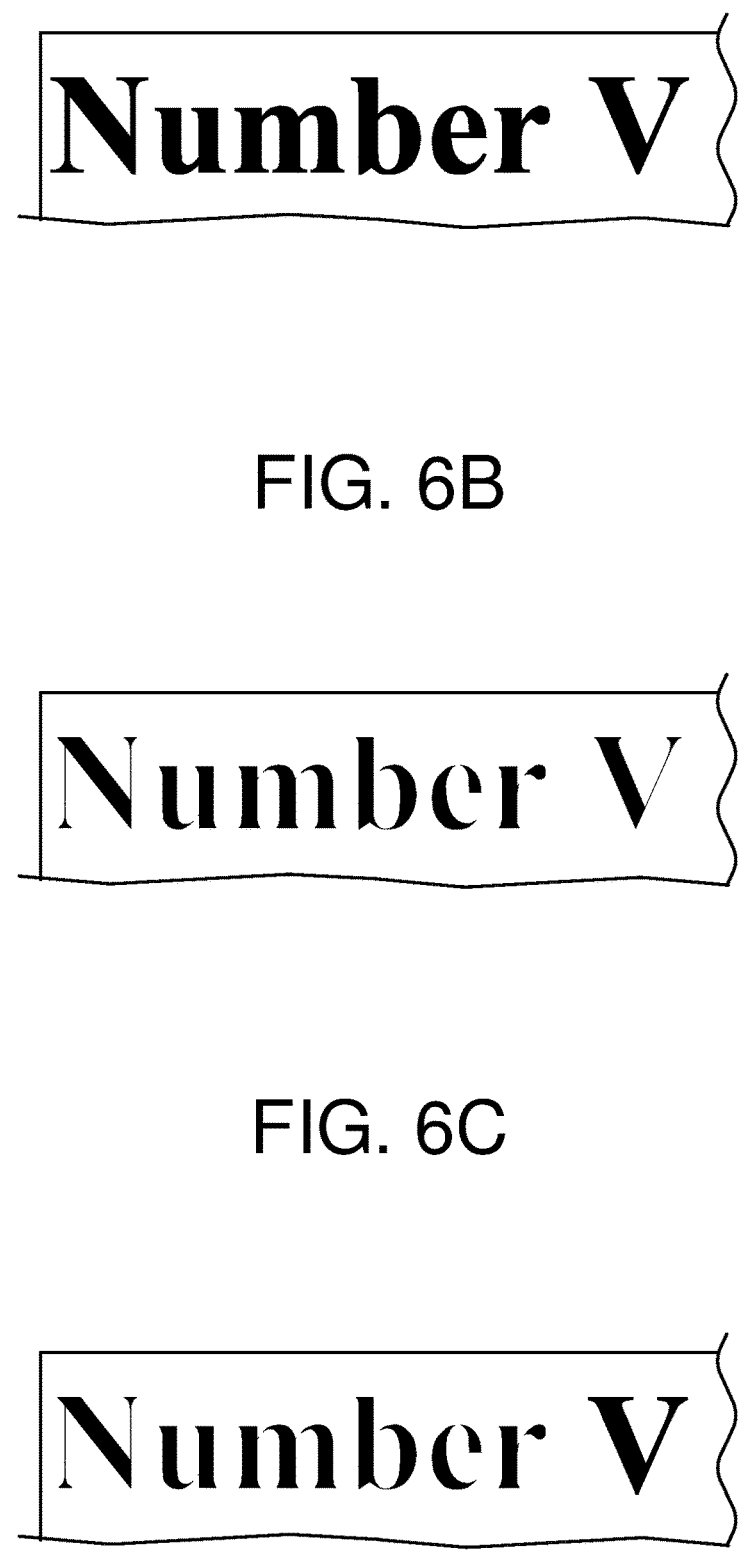
Figure 6D:

FIGS. 6A to 6F are diagrams illustrating examples of a part of an output image. FIG. 6A is a diagram illustrating a part of an example of an output image obtained when the thickness of the character is not changed from a default setting. FIG. 6B is a diagram illustrating a part of an example of an output image obtained when the first correction condition is satisfied.

Both FIGS. 6A and 6B illustrate a part of the output image including the character string "Number V". However, as illustrated in FIG. 6B, if the thickness of the character is set to "Reduce", the character "V" may be erroneously recognized as independent symbols "\" and "". In such a case, the character code corresponding to the character "V" corresponds to the non-matching character code.

In the first embodiment, if the first correction condition is satisfied, that is, if a non-matching character occurs as a result of which the thickness of the character is set to "Reduce", a corrected image (a first corrected Image) is generated in accordance with the non-matching character code. In this case, an image is corrected so that the thickness of the non-matching character included in the output image increases. That is, the thickness of the non-matching character is returned to the thickness corresponding to the default setting.

Specifically, the non-matching character included in the output image is corrected to increase the thickness of the character (thickness-increase correction) to increase the number of dots forming the non-matching character. For example, as illustrated in FIG. 6B, if the character "V" corresponds to a non-matching character as a result of which the thickness of the character is set to "Reduce", the thickness-increase correction is executed. Then, as illustrated in FIG. 6C, a first corrected image including the character string "Number V" in which only the thickness of the character "V" is increased is generated.

Figure 6E:

On the other hand, FIG. 6D is a diagram illustrating a part of an example of an output image obtained when the thickness of the character is not changed from the default setting. FIG. 6E is a diagram illustrating a part of an example of an output image obtained when the second correction condition and the third correction condition are satisfied.

Both FIGS. 6D and 6E illustrate a part of an example of an output image including a character string "last" and a symbol "!". However, as illustrated in FIG. 6E, if the thickness of the character is set to "Increase", and if the bold character condition is satisfied, the symbol "!" may be erroneously recognized as the number "1" or as the uppercase alphabet "I". In such a case, the character code corresponding to the symbol "!" corresponds to a non-matching character code.

In the first embodiment, if the second correction condition is satisfied, that is, if a non-matching character occurs as a result of which the thickness of the character is set to "Increase", a corrected image (a second corrected image) is generated in accordance with the non-matching character code. In this case, the output is corrected so that the thickness of the non-matching character included in the image reduces. That is, the thickness of the non-matching character is returned to the thickness corresponding to the default setting.

Figure 6F:

Specifically, the non-matching character included in the output image is corrected to reduce the thickness of the character (thickness-reduction correction) to reduce the number of dots forming the non-matching character. For example, as illustrated in FIG. 6E, if the symbol "!" corresponds to a non-matching character as a result of which the thickness of the character is set to "Increase", the thickness-reduction correction is executed. Then, as illustrated in FIG. 6F, a second corrected image including the character string "last" and the symbol "!" in which the thickness of only the symbol "!" is reduced is generated. The same applies to a case where the third correction condition is satisfied. If the third correction condition is satisfied, the thickness of the character is set to "Unchanged", and therefore, the thickness of the non-matching character changes to the same thickness as a case where the thickness of the character is set to "Reduce".

If the correction condition is satisfied and a corrected image (a first corrected image or a second corrected image) is generated, the operation information is updated to print the corrected image as a print image. That is, the operation of the image forming apparatus 12 is changed to an operation performed when the corrected image is printed as the print image.

In the first embodiment, if all or some of non-matching characters included in the output image are corrected, and the first corrected image or the second corrected image is generated, the corrected image thus generated is set to the print image. On the other hand, if a corrected image is not generated because the output image does not include a character or the correction condition is not satisfied, the output image is set to the print image.

The above-described operation of the information processing system 10 is implemented when the CPU 50 of the information processing device 14 executes an information processing program for the information processing device 14 stored in the RAM 54, and the CPU 20 of the image forming apparatus 12 executes an information processing program for the image forming apparatus 12 stored in the RAM 24. The specific processing will be described below using a flowchart.

Figure 7:
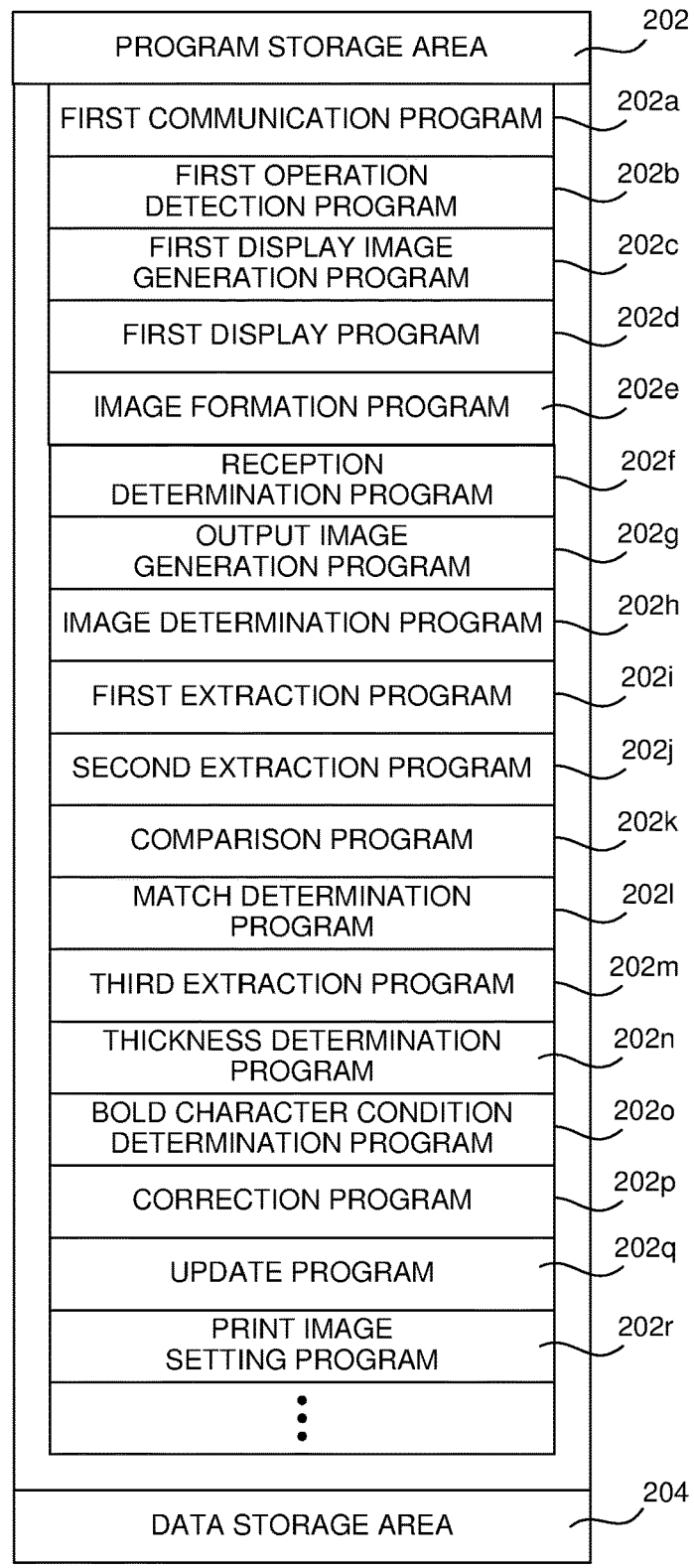
FIG. 7 is a diagram illustrating an example of a memory map of a RAM of the image forming apparatus.
Figure 8:
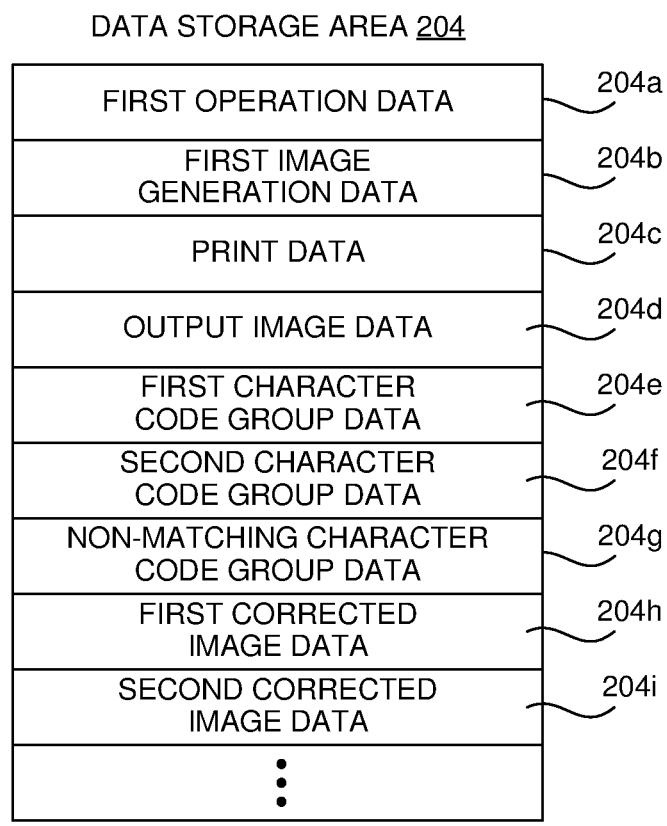
FIG. 8 is a diagram illustrating an example of specific contents of a data storage area of a RAM of the image forming apparatus.

FIG. 7 and FIG. 8 are diagrams illustrating an example of a memory map 200 of the RAM 24 of the image forming apparatus 12 illustrated in FIG. 1. As illustrated in FIG. 7 and FIG. 8, the RAM 24 includes a program storage area 202 and a data storage area 204. In the program storage area 202 of the RAM 24, a control program of the image forming apparatus 12 is stored as an example of the information processing program. The control program of the image forming apparatus 12 includes a first communication program 202a, a first operation detection program 202b, a first display image generation program 202c, a first display program 202d, an image formation program 202e, a reception determination program 202f, an output image generation program 202g, an image determination program 202h, a first extraction program 202i, a second extraction program 202j, a comparison program 202k, a match determination program 202l, a third extraction program 202m, a thickness determination program 202n, a bold character condition determination program 202o, a correction program 202p, an update program 202q, and a print image setting program 202r.

The first communication program 202a is a program for communicating with the information processing device 14 on the network 16.

The first operation detection program 202b is a program for detecting an operation on the image forming apparatus 12. Specifically, the first operation detection program 202b is a program for the CPU 20 acquiring, if the touch panel 36 is touched, touch coordinate data output from the touch panel 36, and detecting operations on software keys included in the various screens displayed on the display 38, according to the first operation detection program 202b. The first operation detection program 202b is also a program for the CPU 20 detecting, if a hardware button or key is depressed or operated, the depressing or operation on the button or key, according to the first operation detection program 202b.

The first display image generation program 202c is a program for generating display image data using the first image generation data 204b (see FIG. 8) described below.

The first display program 202d is a program for displaying, on the display 38, a display image corresponding to the display image data generated according to the first display image generation program 202c.

The image formation program 202e is a program for controlling the image former 32 to form a print image on a sheet.

The reception determination program 202f is a program for determining whether print information transmitted from the information processing device 14 has been received.

The output image generation program 202g is a program for generating an output image according to image configuration information included in print information transmitted from the information processing device 14.

The image determination program 202h is a program for determining whether an output image is an image including a character. It is determined whether an output image includes a character, based on whether image configuration information includes a character code.

The first extraction program 202i is a program for extracting a first character code group from image configuration information if an output image includes a character.

The second extraction program 202j is a program for extracting a second character code group from an output image.

The comparison program 202k is a program for comparing the first character code group and the second character code group. The match determination program 202l is a program for determining whether the compared first character code group and second character code group match.

The third extraction program 202m is a program for extracting a non-matching character code group from the first character code group if the first character code group does not match the second character code group.

The thickness determination program 202n is a program for determining the setting of the thickness of the character according to the quality operation information, and is specifically, a program for determining whether the thickness of the character is set to "Reduce", whether the thickness of the character is set to "Increase", and whether the thickness of the character is set to "Unchanged".

The bold character condition determination program 202o is a program for determining whether the bold character condition is satisfied according to the quality operation information if the thickness of the character is set to "Unchanged".

The correction program 202p is a program for generating a corrected image according to the satisfied correction condition if the correction condition is satisfied according to the quality operation information.

The update program 204*q* is a program for updating operation information to operation information for printing the corrected image as a print image when a corrected image is generated.

The print image setting program 202*r* is a program for setting any one of an output image, a first corrected image, and a second corrected image to a print image.

Although not illustrated, the program storage area 202 also stores other programs necessary for controlling the image forming apparatus 12.

FIG. 8 is a diagram illustrating an example of specific contents of the data storage area 204 illustrated in FIG. 7. The data storage area 204 stores first operation data 204*a*, first image generation data 204*b*, print data 204*c*, output image data 204*d*, first character code group data 204*e*, second character code group data 204*f*, non-matching character code group data 204*g*, first corrected image data 204*h*, and second corrected image data 204*i*.

The first operation data 204*a* is operation data detected according to the first operation detection program 202*b*, and is stored in time series. The first operation data 204*a* is deleted after being used for the processing of the CPU 20.

The first image generation data 204*b* is data including polygon data and texture data for generating display image data corresponding to a display image displayed on the display 38.

The print data 204*c* is data on print information transmitted from the information processing device 14 on the network 16. The print data 204*c* includes operation data being data on operation information and image configuration data being data on image configuration information. The operation data includes the quality operation data corresponding to the quality operation information and other operation data corresponding to the other operation information.

The output image data 204*d* is data corresponding to an output image. The first character code group data 204*e* is data corresponding to the first character code group. The second character code group data 204*f* is data corresponding to the second character code group.

The non-matching character code group data 204*g* is data corresponding to the non-matching character code group. The non-matching character code group data 204*g* is temporarily stored in the data storage area 204.

The first corrected image data 204*h* is data corresponding to the first corrected image, and the second corrected image data 204*i* is data corresponding to the second corrected image.

Figure 9:
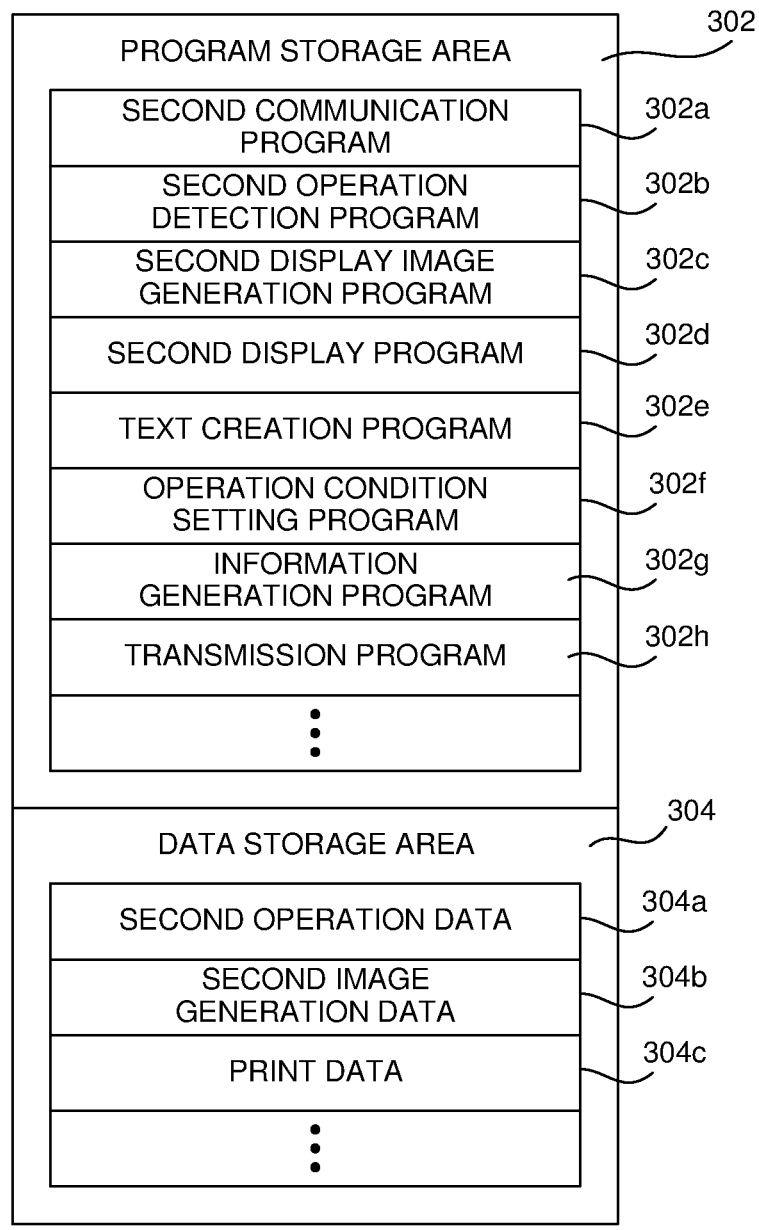
FIG. 9 is a diagram illustrating an example of a memory map of a RAM of the information processing device.

FIG. 9 is a diagram illustrating an example of a memory map 300 of the RAM 54 of the information processing device 14 illustrated in FIG. 1. As illustrated in FIG. 9, the RAM 54 includes a program storage area 302 and a data storage area 304. In the program storage area 302 of the RAM 54, a control program of the information processing device 14 is stored as an example of the information processing program. The control program of the information processing device 14 includes a second communication program 302*a*, a second operation detection program 302*b*, a second display image generation program 302*c*, a second display program 302*d*, a text creation program 302*e*, an operation condition setting program 302*f*, an information generation program 302*g*, and a transmission program 302*h*.

The second communication program 302*a* is a program for communicating with the image forming apparatus 12 on the network 16.

The second operation detection program 302*b* is a program for detecting an operation on the operation processor 66.

The second display image generation program 302*c* is a program for generating display image data for displaying various types of display images on the display 64 using second image generation data 304*b* described below.

The second display program 302*d* is a program for displaying, on the display 64, a display image corresponding to the display image data generated according to the second display image generation program 302*c*.

The text creation program 302*e* is a program for exhibiting the text creation function. The operation condition setting program 302*f* is a program for setting an operation condition of the image forming apparatus 12.

The information generation program 302*g* is a program for generating print information in accordance with an electronic document and the setting of the operation condition.

The transmission program 302*h* is a program for transmitting print data 304*c* on print information to the image forming apparatus 12 on the network 16.

Although not illustrated, another program, and the like necessary for controlling the information processing device 14 are also stored in the program storage area 302.

The data storage area 304 stores the second operation data 304*a*, the second image generation data 304*b*, and the print data 304*c*.

The second operation data 304*a* is operation data detected according to the second operation detection program 302*b*, and is stored in time series. The second operation data 304*a* is deleted after being used for the processing of the CPU 50.

The second image generation data 304*b* is data including polygon data and texture data for generating display image data for a display image displayed on the display 38.

The print data 304*c* is data on print information to be transmitted to the image forming apparatus 12 on the network 16 and is same as the above-described print data 204*c*, and thus, duplicated description will be omitted.

Figure 10:
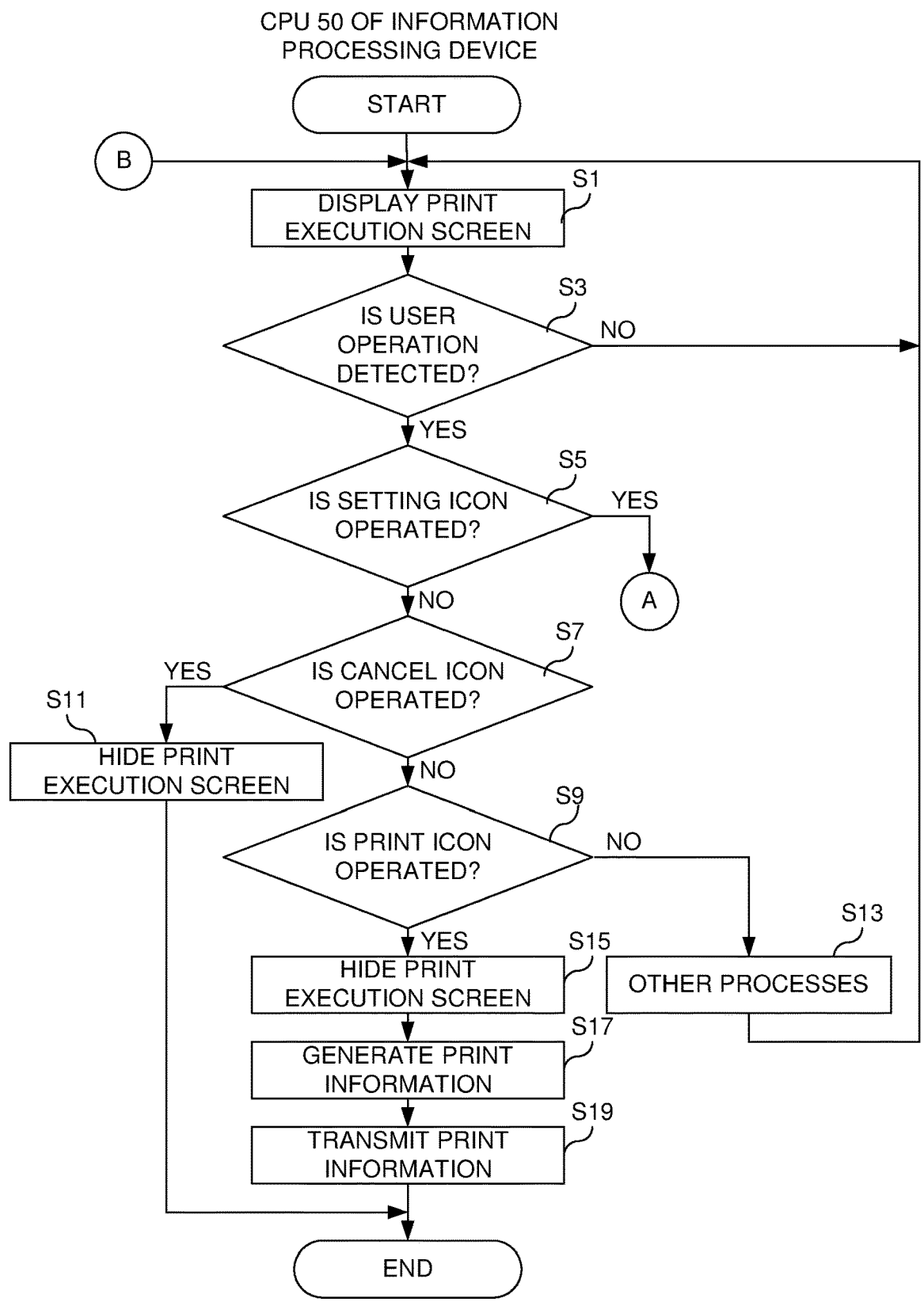
FIG. 10 is a flowchart illustrating a part of an example of a print instruction process of a CPU of the information processing device.
Figure 11:
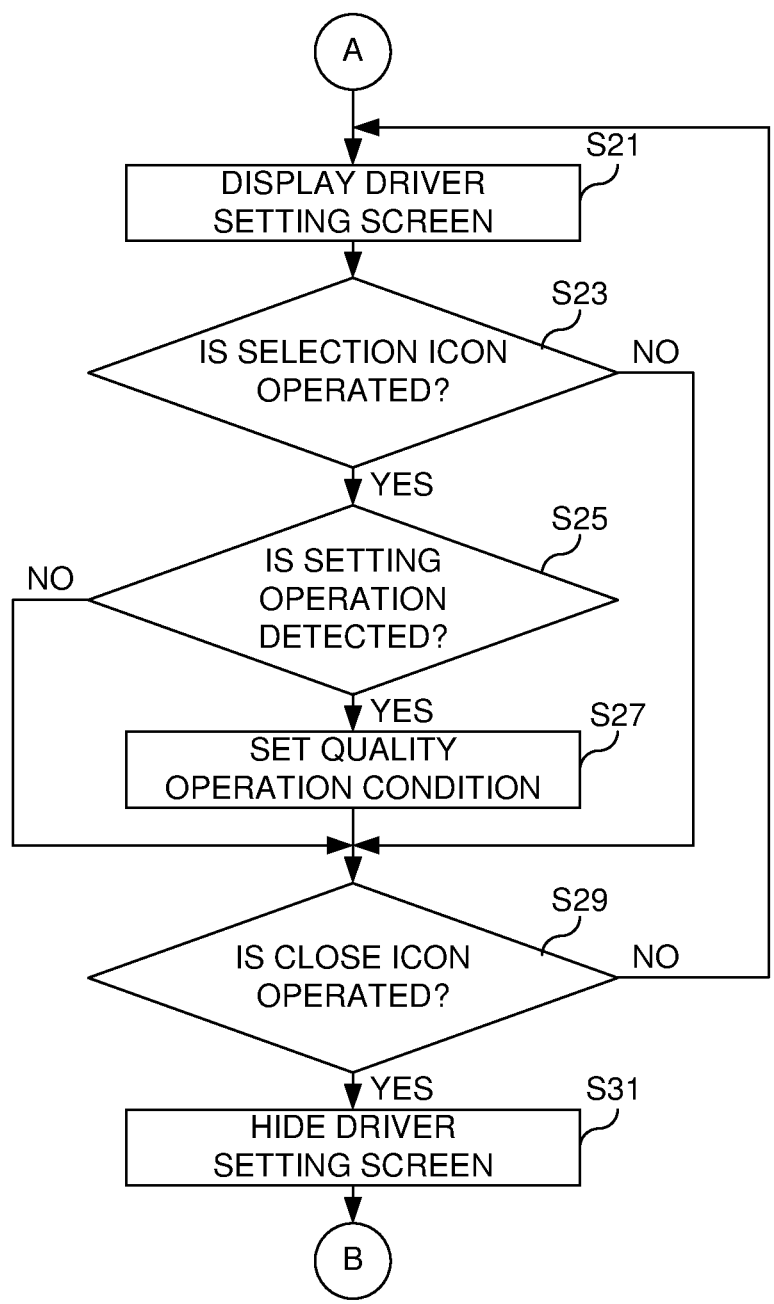
FIG. 11 is a flowchart subsequent to FIG. 10, illustrating another part of the example of the print instruction process of the CPU of the information processing device.

FIG. 10 and FIG. 11 are flowcharts illustrating an example of the print instruction process of the CPU 50 of the information processing device 14. As illustrated in FIG. 10, if a user operation for displaying the print execution screen 100 is received, the CPU 50 starts a print instruction process, and performs control to displays the print execution screen 100 on the display 64 in step S1.

In step S3, it is determined whether the user operation is detected. If "NO" is determined in step S3, that is, if the user operation is not detected, the processing returns to step S1. On the other hand, if "YES" is determined in step S3, that is, if the user operation is detected, the processing proceeds to step S5.

In step S5, it is determined whether the setting icon 108 is operated. If "NO" is determined in step S5, that is, if the setting icon 108 is not operated, the processing proceeds to step S7. On the other hand, if "YES" is determined in step S5, that is, if the setting icon 108 is operated, the processing proceeds to step S21 illustrated in FIG. 11.

In step S7, it is determined whether the cancel icon 106 is operated. If "NO" is determined in step S7, that is, if the cancel icon 106 is not operated, the processing proceeds to step S9. On the other hand, if "YES" is determined in step S7, that is, if the cancel icon 106 is operated, then in step S11, the print execution screen 100 is hidden from the display 64, and the print instruction process is ended.

In step S9, it is determined whether the print icon 110 is operated. If "NO" is determined in step S9, that is, if the print icon 110 is not operated, the processing proceeds to step S13. On the other hand, if "YES" is determined in step S9, that is, if the print icon 110 is operated, the processing proceeds to step S15.

In step S13, other processes are performed, and the processing returns to step S1. Here, the other processes include a process performed in response to an operation on the selection icon 104 (104a, 104b), a process performed in response to a setting operation, a setting of a transmission destination of print information in response to an operation on the icon 102, and the like.

In step S15, the print execution screen 100 is hidden, and in step S17, print information is generated.

In step S19, the print information generated in step S17 is transmitted to the image forming apparatus 12, and then the print instruction process is ended. Although not illustrated, if the print instruction process is ended, each of the operation conditions is returned to the default state.

In step S21 of FIG. 11, the driver setting screen 120 is displayed on the display 64, and in step S23, it is determined whether the selection icon 122 (122a to 122e) is operated. If "NO" is determined in step S23, that is, if the selection icon 122 (122a to 122e) is not operated, the processing proceeds to a step S29. On the other hand, if "YES" is determined in step S23, that is, if the selection icon 122 (122a to 122e) is operated, the processing proceeds to step S25.

In step S25, it is determined whether a setting operation is detected. If "NO" is determined in step S25, that is, if the setting operation is not detected, the processing proceeds to step S29. On the other hand, if "YES" is determined in step S25, that is, if a user operation is detected, the processing proceeds to step S27.

In step S27, the quality operation condition assigned to the operated selection icon 122 (122a to 122e) is set, and the processing proceeds to step S29.

In step S29, it is determined whether the close icon 124 is operated. If "NO" is determined in step S29, that is, if the close icon 124 is not operated, the processing returns to step S21. On the other hand, if "YES" is determined in step S29, that is, if the close icon 124 is operated, the processing proceeds to step S31.

In step S31, the driver setting screen 120 is hidden from the display 64, and the processing returns to step S1 illustrated in FIG. 10.

Figure 12:
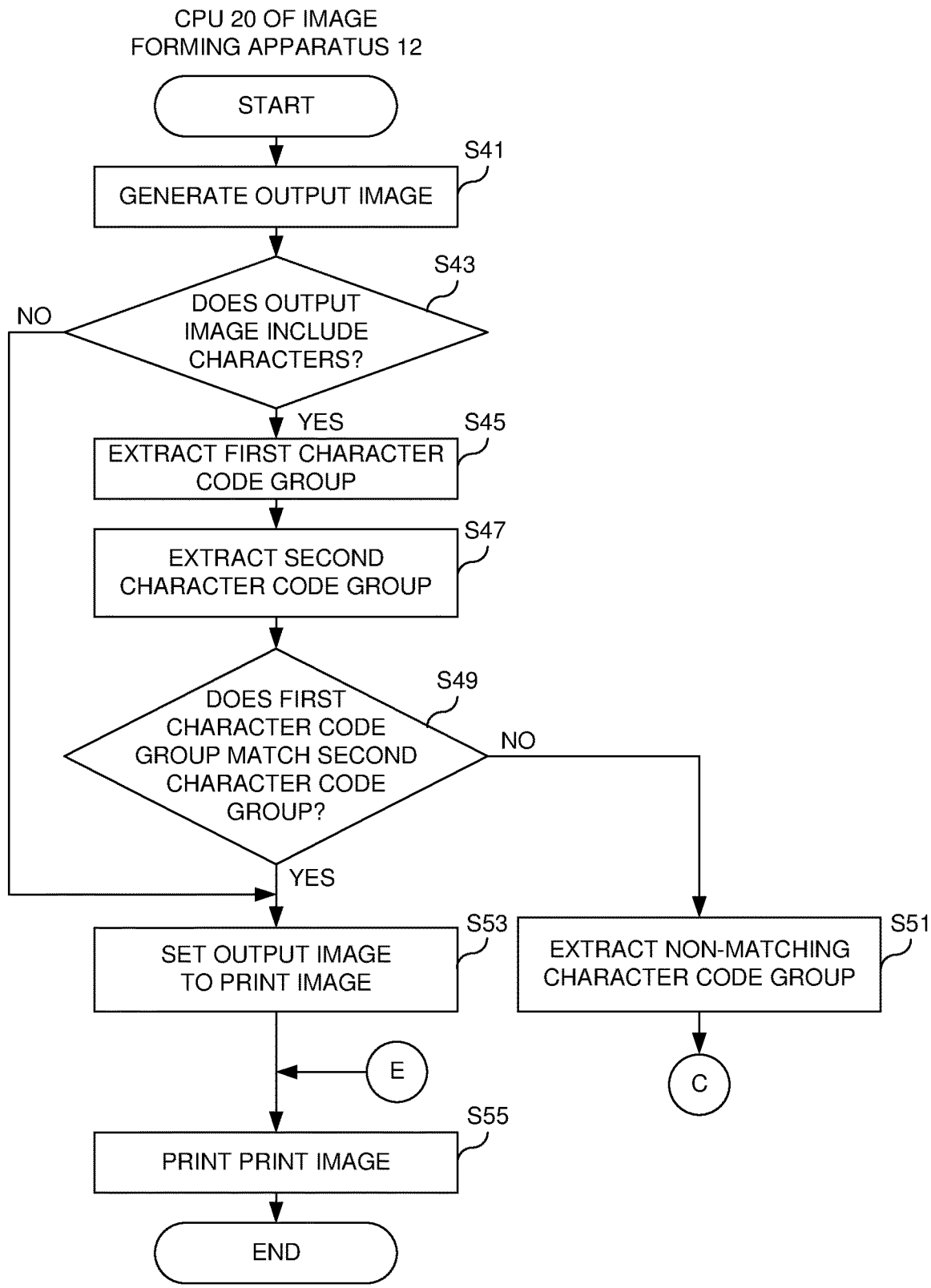
FIG. 12 is a flowchart illustrating a part of an example of a print process of a CPU of the image forming apparatus.
Figure 13:
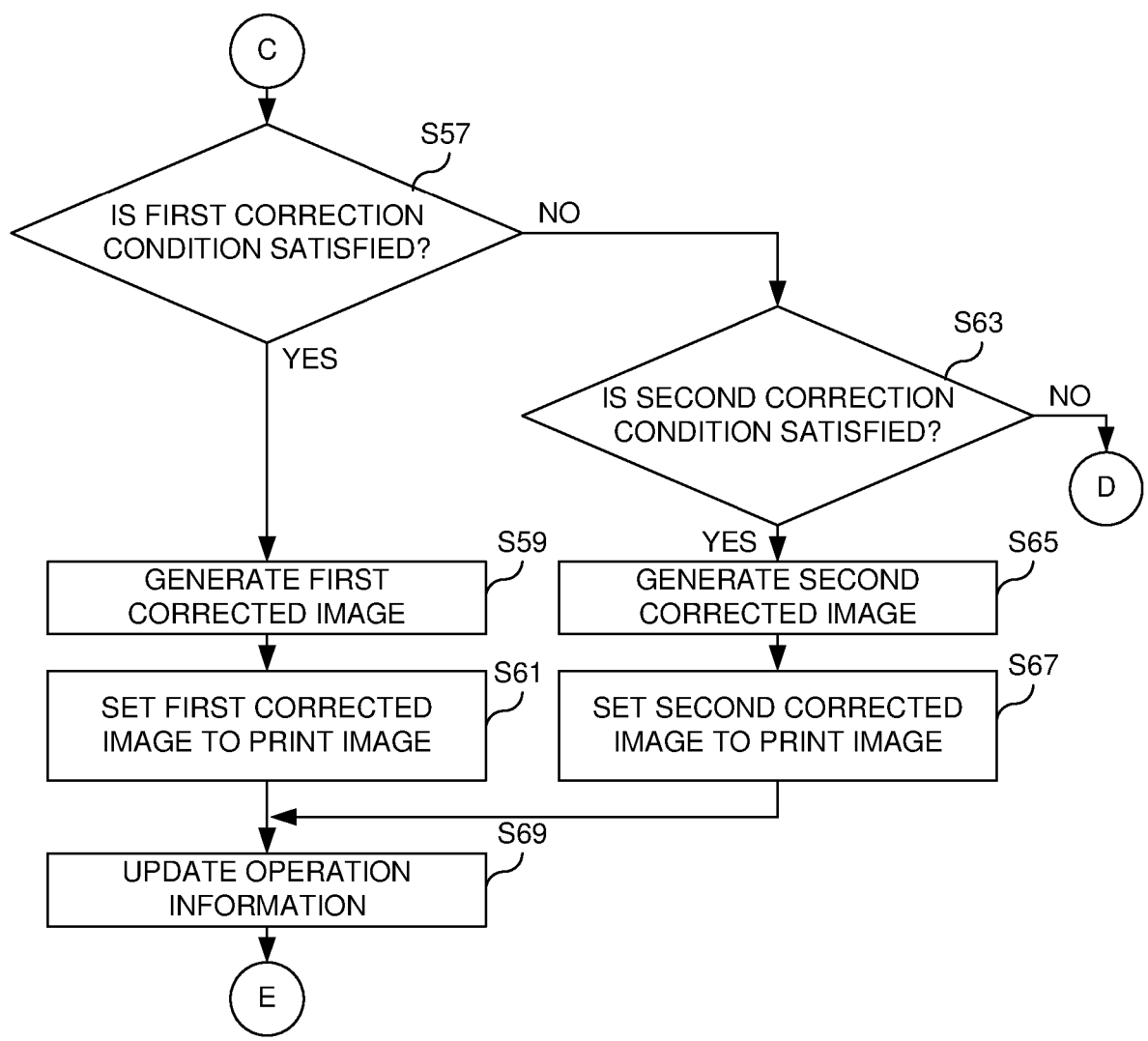
FIG. 13 is a flowchart subsequent to FIG. 12, illustrating another part of the example of the print process of the CPU of the image forming apparatus.
Figure 14:
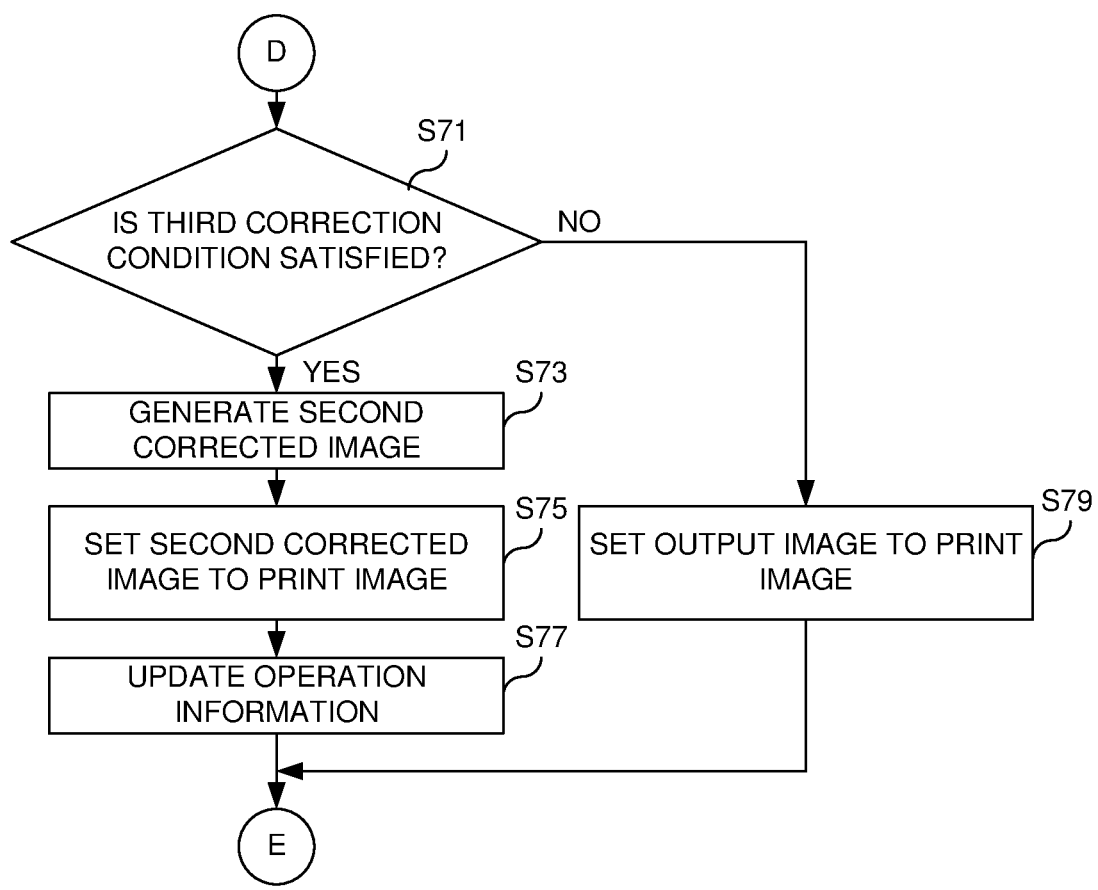
FIG. 14 is a flowchart subsequent to FIG. 13, illustrating yet another part of the example of the print process of the CPU of the image forming apparatus.

FIG. 12, FIG. 13, and FIG. 14 are flowcharts illustrating an example of the print process of the CPU 20 of the image forming apparatus 12. As illustrated in FIG. 12, if print information is received, the CPU 20 generates an output image according to the image configuration information, in step S41, and the processing proceeds to step S43.

In step S43, it is determined whether the output image is an image including a character. Here, it is determined whether the character configuration information includes a character code. If "NO" is determined in step S43, that is, if the output image is an image not including a character, the processing proceeds to step S53. On the other hand, if "YES" is determined in step S43, that is, if the output image is an image including a character, the processing proceeds to step S45.

In step S45, a first character code group is extracted from the image configuration information, and in step S47, a second character code group is extracted from the output image.

In step S49, it is determined whether the first character code group matches the second character code group. Here, the first character code group and the second character code group are compared, and whether the first character code group matches the second character code group is determined based on the result of the comparison.

If "NO" is determined in step S49, that is, if the first character code group does not match the second character code group, then in step S51, a non-matching character code group is extracted from the first character code group, and the processing proceeds to step S57 illustrated in FIG. 13. On the other hand, if "YES" is determined in step S49, that is, if the first character code group matches the second character code group, then in step S53, an output image is set to a print image, and in step S55, the print image is printed on a sheet. The print image is printed on the sheet, and then the print process is ended.

In step S57 of FIG. 13, it is determined whether the first correction condition is satisfied. If "NO" is determined in step S57, that is, if the first correction condition is not satisfied, the processing proceeds to step S63. On the other hand, if "YES" is determined in step S57, that is, if the first correction condition is satisfied, the first corrected image is generated in step S59. If the first corrected image is generated, then in step S61, the first corrected image is set to the print image, and the processing proceeds to step S69.

In step S63, it is determined whether the second correction condition is satisfied. If "NO" is determined in step S63, that is, if the second correction condition is not satisfied, the processing proceeds to step S71 illustrated in FIG. 14. On the other hand, if "YES" is determined in step S63, that is, if the second correction condition is satisfied, then in step S65, a second corrected image is generated. If the second corrected image is generated, then in step S65, the second corrected image is set to the print image, and the processing proceeds to step S69. If the operation information is updated to operation information for printing the corrected image as the print image in step S69, the processing proceeds to step S55 illustrated in FIG. 12.

In step S71 illustrated in FIG. 14, it is determined whether the third correction condition is satisfied. If "NO" is determined in step S71, that is, if the third correction condition is not satisfied, then in step S79, the output image is set to the print image, and the processing proceeds to step S55 illustrated in FIG. 12. On the other hand, if "YES" is determined in step S71, that is, if the third correction condition is satisfied, the processing proceeds to step S73. Steps S73 to S77 correspond to steps S65 to S69 illustrated in FIG. 13, and therefore, duplicated description will be omitted.

In the first embodiment, if the print information is received, an output image is generated from the image configuration information included in the print information, and a first character code group is extracted from the image configuration information. Further, a second character code group is extracted from the output image, based on the determination of the OCR function nearly equivalent to an ability of a user to recognize a character.

According to the first embodiment, if the output image includes a non-matching character which a user recognizes with difficulty in accordance with the difference between the first character code group and the second character code group, it is possible to generate a corrected image in which all or a part of the non-matching character is corrected.

In the first embodiment, if the first character code group does not match the second character code group, the above-described determination of whether the correction condition is satisfied may be omitted to perform a predetermined correction.

Further, if the correction condition is not satisfied, either one of the thickness-reduction correction and the thickness-increase correction may be executed.

Also, the quality operation condition may include an operation condition for setting the automatic correction function to enabled or disabled.

Second Embodiment

A second embodiment is similar to the first embodiment except that the process performed when print information of the image forming apparatus 12 is received is partially changed, and therefore, duplicated description will be omitted.

In the image forming apparatus 12 according to the second embodiment, the storage 26 stores first learning information. The first learning information includes a non-matching character code (a processed character code) corresponding to the non-matching character corrected as a result of generation of the corrected image, information on the status when the processed character code is generated (first status information), and information on the correction of the non-matching character (first correction information). The processed character code, the first status information, and the first correction information are associated with each other.

The first status information is information similar to the quality operation information. The first status information may include information of the characters included in the image configuration information, for example, information on the point size of the characters and the font of the characters. Further, the first correction information includes information of either one of the thickness-increase correction and thickness-reduction correction.

The first learning information is stored in the storage 26, but if necessary, is acquired from the storage 26 and stored in the RAM 24.

In the image forming apparatus 12 according to the second embodiment, a first output image is generated from the image configuration information, and it is determined whether the first output image is an image including a character. If the first output image is an image including a character, a first character code group is extracted from the first output image.

If the first character code group is extracted from the image configuration information, it is determined according to the first learning information whether the first output image includes a non-matching character correctable in advance. Hereinafter, a series of processes from extraction of the first character code group to determination of whether the first output image includes a non-matching character correctable in advance will be described.

If the first character code group is extracted and the first learning information is referenced, it is determined whether the first character code group includes a character code matching the processed character code, that is, whether the first character code group includes a processed character code.

If the first character code group includes a processed character code, the past and present statuses are compared according to the first status information and the latest print information. Specifically, the quality operation information included in the first status information and the quality operation information included in the latest print information are compared.

If the current status and the past status are the same, then when the first character code group and the second character code group are compared, it is determined that the condition where the character corresponding to the processed character code could be a non-matching character is satisfied.

If the first character code group includes the processed character code and the condition where the character corresponding to the processed character code could be a non-matching character is satisfied, it is possible to correct the character according to the first correction information. Therefore, if the condition where the character corresponding to the processed character code included in the first output image could be a non-matching character is satisfied, the first correction information is referenced, and an image (the second output image) in which the character corresponding to the processed character code is corrected in advance is generated. If the second output image is generated, the operation information is updated to operation information for printing the second output image as a print image.

For example, it is assumed that the first learning information includes the processed character code "AAA", and the first status information corresponding to the processed character code includes information in which the document size is set to "A4", the page aggregation is set to "2", the thickness of the character is set to "Increase", and the magnification is set to "100%". It is assumed that the first correction information includes information on the thickness-reduction correction.

In this case, if the character code "AAA" is included in the first character code group, and the latest quality operation information includes the information similar to the first status information, then the condition where a character corresponding to the character code "AAA" included in the first output image could be a non-matching character is satisfied. Therefore, the thickness-reduction correction is performed on the character corresponding to the character code "AAA".

In the second embodiment, since the second output image is generated as needed, one either of the first output image and the second output image is used for extracting the second character code group. Specifically, if the second output image is generated, a second character code group is extracted from the second output image. The processing after the second character code group is extracted is similar to that in the first embodiment, and therefore, duplicated description will be omitted.

In the second embodiment, when a corrected image (the first output image or the second output image) is set to the print image, the character code group including all character codes is extracted from the corrected image by a method similar to the method by which the second character code group is extracted. Hereinafter, the character code group extracted from the corrected image is referred to as a third character code group.

It is determined whether the first character code group matches the third character code group if the third character code group is extracted. If the first character code matches the third character code, it is determined that all non-matching character codes included in the non-matching character code group are processed character codes.

On the other hand, if the first character code does not match the third character code, it is determined whether the processed character code is included in the non-matching character code group. Specifically, if a character code matching the non-matching character code is included in the third character code group, the non-matching character code is determined to be a processed character code.

If the processed character code is included in the non-matching character code group, the first learning information is generated according to the processed character code and the latest print information. Specifically, the first status information is generated based on the latest quality operation information.

The first correction information is generated based on information on the setting of the thickness of the character in the quality operation information. For example, if the quality operation information includes a setting in which the thickness of the character is set to "Increase", the first correction information includes information on the thickness-reduction correction. The same applies a case where quality operation information includes a setting in which the thickness of the character is set to "Unchanged" and the quality operation information includes a setting in which the quality operation condition is set to satisfy the bold character condition. If the quality operation information includes a setting in which the thickness of the character is set to "Reduce", the first correction information includes information on the thickness-increase correction.

The first learning information is generated and then stored in the storage 26. If other first learning information is already stored, the first learning information is stored to be accumulated (learned).

Although not illustrated, the control program of the image forming apparatus 12 according to the second embodiment includes a processed-character determination program, a character determination program, a pre-correction program, an output image determination program, a fourth extraction program, a second comparison program, a process determination program, a first information generation program, and a storage program.

The output image generation program 202g according to the second embodiment is a program for generating a first output image according to the image configuration information. The image determination program 202h according to the second embodiment is a program for determining whether the first output image is an image including a character.

The first extraction program 202i according to the second embodiment is a program for extracting a first character code group from image configuration information if the first output image is an image including a character.

The second extraction program 202j according to the second embodiment is a program for extracting a second character code group from the second output image if the second output image is generated, and from the first output image if the second output image is not generated.

The comparison program 202k according to the second embodiment is also a program for comparing the first character code group and the third character code group. The match determination program 202l according to the second embodiment is a program for determining whether the compared first character code group and third character code group match.

The update program 204q according to the second embodiment is a program for updating the operation information to operation information for printing the second output image as a print image if the second output image is set to the print image.

The processed-character determination program is a program for determining whether the first character code group includes a processed character code by referencing the first learning information.

The character determination program is a program for determining whether the condition where the character corresponding to a processed character code could be a non-matching character is satisfied by referencing the first status information if the first character code group includes the processed character code.

The pre-correction program is a program for generating the second output image if the first output image includes a character corresponding to the processed character code, and the condition where the character could be a non-matching character is satisfied.

The output image determination program is a program for determining whether the second output image is generated according to an image flag described below.

The fourth extraction program is a program for extracting the third character code group from a corrected image if the corrected image is generated.

The processed-character determination program is a program for determining whether the non-matching character code group includes the processed character code if the first character code group does not match the third character code group.

The first information generation program is a program for generating the first learning information according to the processed character code and the latest print information if the first character code group matches the third character code group. The first information generation program is also a program for generating the first learning information according to the processed character code and the latest print information if the first character code group and the third character code group do not match, but the non-matching character code group includes the processed character code.

The storage program is a program for storing the generated first learning information in the storage 26.

Although not illustrated, the data storage area 204 of the image forming apparatus 12 according to the second embodiment stores third character code group data, first learning data, and an image flag.

The third character code group data is data on the third character code group. The first learning data is data corresponding to the first learning information, and the first learning data includes data corresponding to the processed character code, data corresponding to the first status information, and data corresponding to the first correction information.

The image flag is a flag for determining whether the second output image is generated. The image flag is turned on if the second output image is generated, and turned off if a print image is printed on a sheet.

Figure 15:
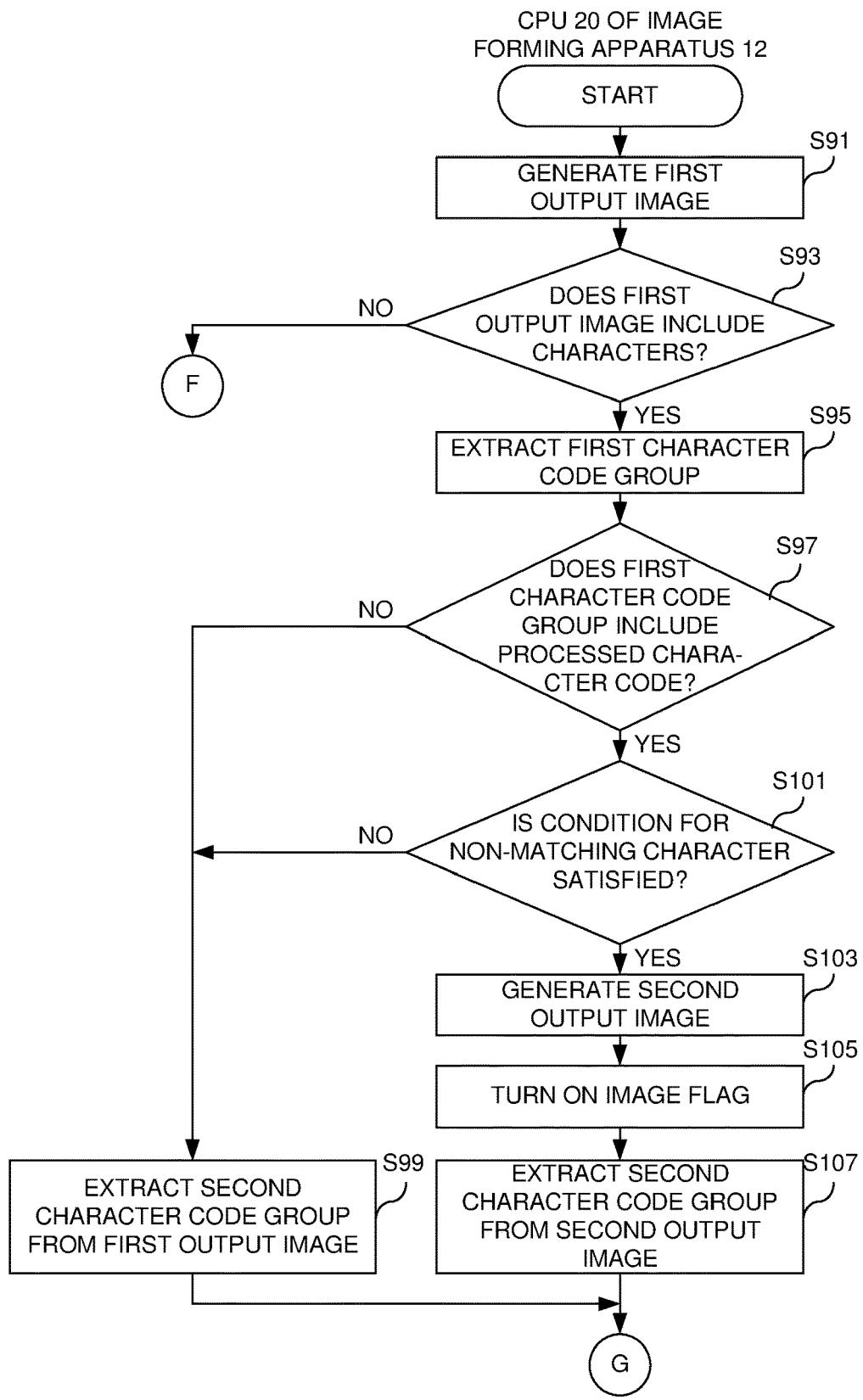
FIG. 15 is a flowchart illustrating a part of an example of a print process of a CPU of an image forming apparatus according to a second embodiment.

FIG. 15, FIG. 16, FIG. 17, and FIG. 18 are flowcharts illustrating a part of an example of the print process of the CPU 20 of the image forming apparatus 12 according to the second embodiment. Description duplicated with the first embodiment shall be omitted. As illustrated in FIG. 15, if print information is received, the CPU 20 generates a first output image according to the image configuration information in step S91, and the processing proceeds to step S93.

In step S93, it is determined whether the first output image is an image including a character. If "NO" is determined in step S93, that is, if the first output image is an image not including a character, the processing proceeds to step S113 illustrated in FIG. 16. On the other hand, if "YES" is determined in step S93, that is, if the output image is an image including a character, the processing proceeds to step S95.

In step S95, a first character code group is extracted from the first output image, and in step S97, it is determined whether the first character code group includes a processed character code. If "NO" is determined in step S97, that is, if the first character code group does not include a processed character code, then in step S99, a second character code group is extracted from the first output image, and the processing proceeds to step S109 of FIG. 16. On the other hand, if "YES" is determined in step S97, that is, if the first character code group includes the processed character code, the processing proceeds to step S101.

In step S101, it is determined whether the first output image satisfies the condition where the character corresponding to the processed character code could be a non-matching character. Here, it is determined whether the first status information and the quality operation information included in the latest print information are similar information.

If "NO" is determined in step S101, that is, if the condition where the character corresponding to the processed character code could be the non-matching character is not satisfied, the processing proceeds to step S99. On the other hand, if "YES" is determined in step S101, that is, if the condition where the character corresponding to the processed character code could be the non-matching character is satisfied, then in step S103, a second output image is generated according to the first correction information.

Figure 16:
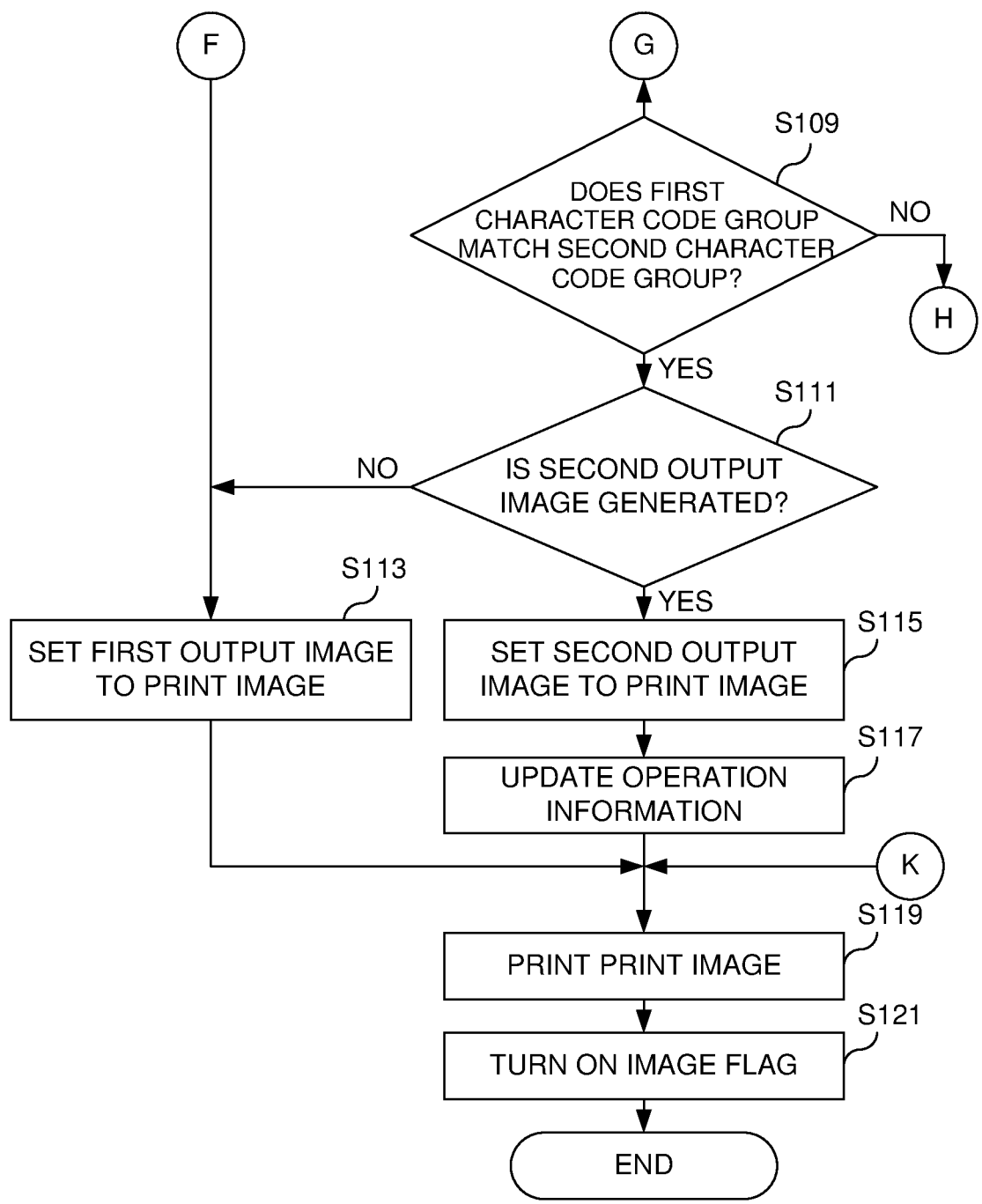
FIG. 16 is a flowchart subsequent to FIG. 15, illustrating another part of the example of the print process of the CPU of the image forming apparatus according to the second embodiment.

In step S105, the image flag is turned on, and if the second character code group is extracted from the second output image in step S107, the processing proceeds to step S109 in FIG. 16.

In step S109 in FIG. 16, it is determined whether the first character code group matches the second character code group. If "NO" is determined in step S109, that is, if the first character code group does not match the second character code group, the processing proceeds to step S123 illustrated in FIG. 17. On the other hand, if "YES" is determined in step S109, that is, if the first character code group matches the second character code group, the processing proceeds to step S111.

In step S111, it is determined whether the second output image is generated. Here, it is determined whether the image flag is ON.

If "NO" in determined in step S111, that is, if the second output image is not generated, then in step S113, the first output image is set as the print image, and the processing proceeds to step S119. On the other hand, if "YES" is determined in step S111, that is, if the second output image is generated, then in step S115, the second output image is set to the print image, and in step S117, the operation information is updated to operation information for printing the second output image as the print image.

In step S119, the print image is printed on a sheet, and when the image flag is turned off, in step S121, the printing process is ended.

Figure 17:
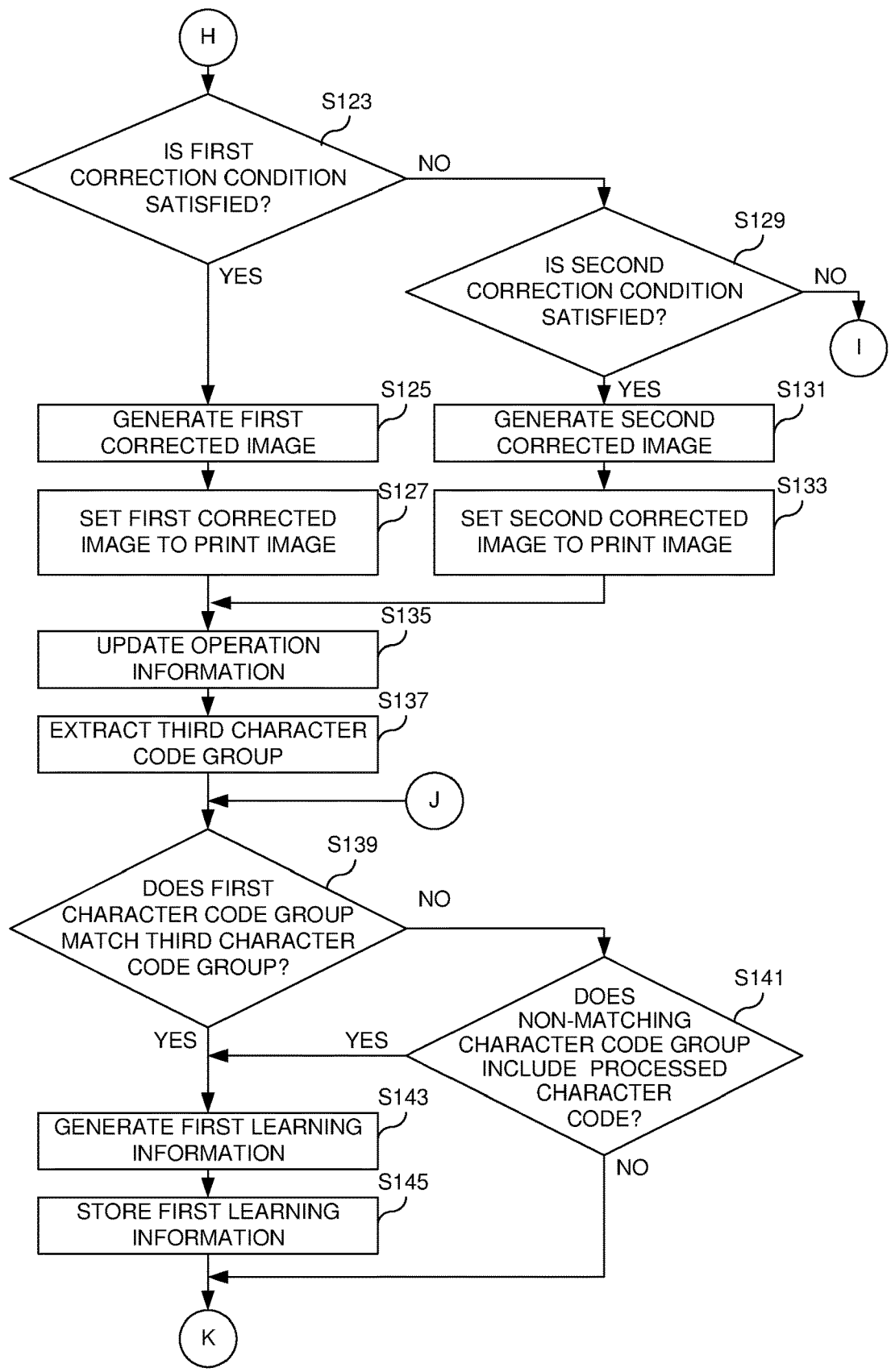
FIG. 17 is a flowchart subsequent to FIG. 16, illustrating yet another part of the example of the print process of the CPU of the image forming apparatus according to the second embodiment.

Steps S123 to S135 illustrated in FIG. 17 correspond to steps S57 to S69 illustrated in FIG. 13, and therefore, duplicated description will be omitted.

In step S137, the third character code group is extracted from the corrected image, and in step S139, it is determined whether the first character code group matches the third character code group. If "NO" is determined in step S139, that is, if the first character code group does not match the third character code group, the processing proceeds to step S141. On the other hand, if "YES" is determined in step S139, that is, if the first character code group matches the third character code group, the processing proceeds to step S143.

In step S141, it is determined whether the non-matching character code group includes a processed character code. If "NO" is determined in step S141, that is, if the non-matching character code group does not include a processed character code, the processing proceeds to step S119 illustrated in FIG. 16. On the other hand, if "YES" is determined in step S141, that is, if the non-matching character code group includes a processed character code, the processing proceeds to step S143.

In step S143, the first learning information is generated from the processed character code and the latest print information, and in step S145, the first learning information is stored. When the first learning information is stored in the storage 26 in step S145, the processing proceeds to step S119 illustrated in FIG. 16

Figure 18:
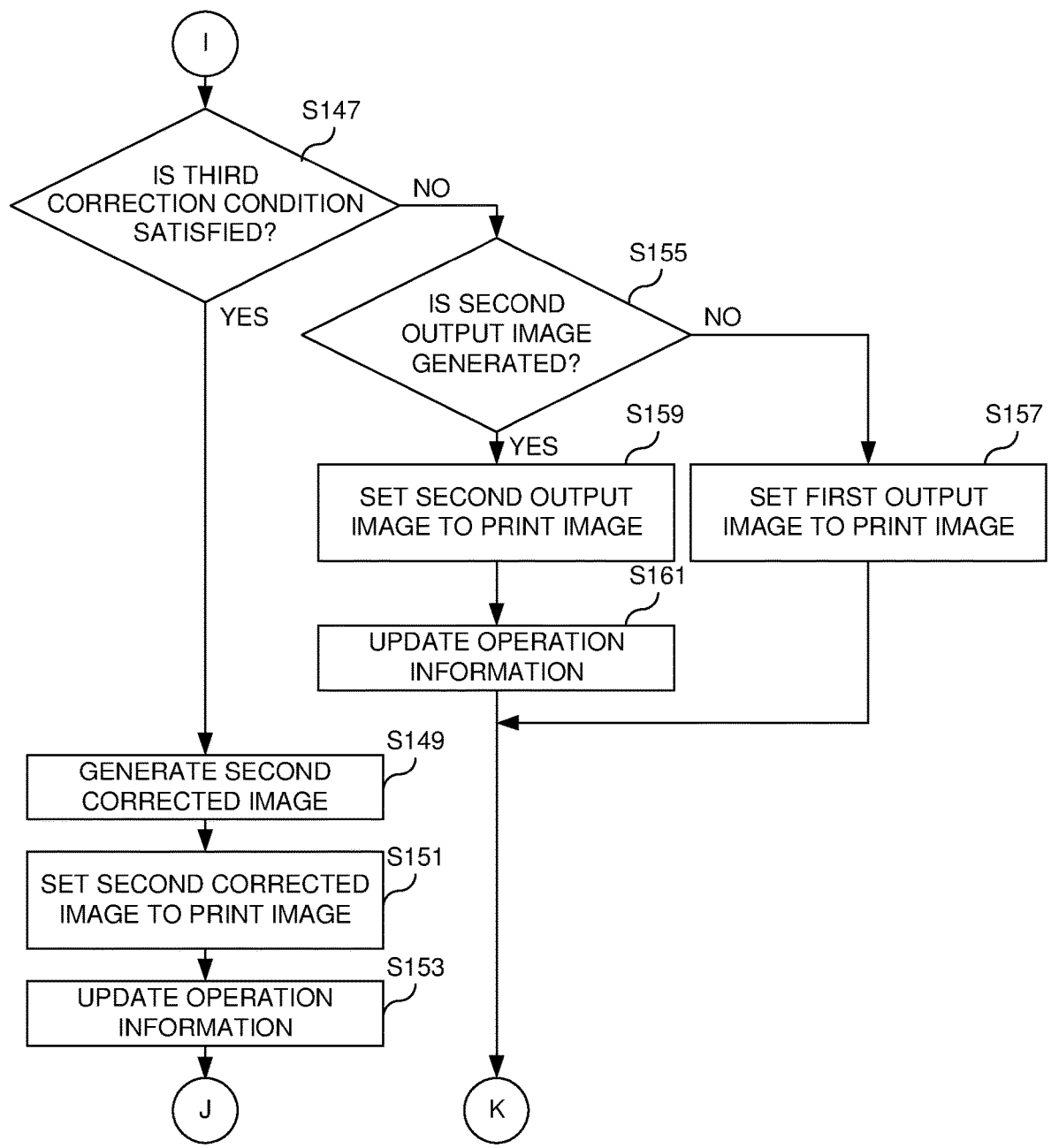
FIG. 18 is a flowchart subsequent to FIG. 17, illustrating still yet another part of the example of the print process of the CPU of the image forming apparatus according to the second embodiment.

Steps S147 to S153 illustrated in FIG. 18 correspond to steps S71 to S77 illustrated in FIG. 14, and steps S155 to S161 correspond to 111 to 117 illustrated in FIG. 16, and therefore, duplicated description will be omitted.

According to the second embodiment, if the first character code group includes a processed character code being a non-matching character code processed in the past, and the condition where a character corresponding to the processed character code could be a non-matching character is satisfied, it is possible to generate a second output image in which the character has been corrected in advance. As a result, the occurrence of a non-matching character can be suppressed in advance, so that it is not necessary to determine whether a predetermined correction condition is satisfied to reduce the load on the controller (such as the CPU 20) of the image forming apparatus 12 as compared with the first embodiment.

Third Embodiment

The processing in the information processing device 14 according to a third embodiment is similar to that according to the above embodiments except that the processes up to the transmission of the print information are partially changed, and therefore, duplicated description will be omitted.

Further, the processing in the image forming apparatus 12 according to the third embodiment is similar to that according to the first embodiment except that the processing performed when the first character code group does not match the second character code group is partially changed, and therefore, duplicated description will be omitted.

In the information processing device 14 according to the third embodiment, the storage 56 stores second learning information. The second learning information includes a non-matching character code (unprocessed character code) corresponding to a non-matching character not corrected so that the character can be correctly recognized, information on a status when the unprocessed character code occurs (second status information), and information on a correction performed on the non-matching character (second correction information). The unprocessed character code, the second status information, and the second correction information are associated with each other.

If the unprocessed character code included in the second learning information is an unprocessed character code generated as a result of which the predetermined correction condition is not satisfied, the second correction information corresponding to the unprocessed character code is not included in the second learning information. The second status information is information similar to the quality operation information. The second status information may include information of characters included in the image configuration information, for example, information on the point size of the characters and the font of the characters.

Further, the second correction information includes either one of the thickness-increase correction and thickness-reduction correction.

The second learning information is stored in the storage 56, but if necessary, is acquired from the storage 56 and stored in the RAM 24.

In the third embodiment, when the driver setting screen 120 is displayed on the display 64 in response to a user operation, an unprocessed character code included in the second learning information is referenced. When the unprocessed character code is referenced, it is determined whether the electronic document includes a character corresponding to the unprocessed character code.

If the electronic document includes a character corresponding to the unprocessed character code, the setting of the quality operation condition is restricted so that the condition where the character could be a non-matching character is not satisfied. Specifically, the quality operation condition cannot be set to correspond to the second status information.

For example, it is assumed that the second learning information includes an unprocessed character code "CCC", and the second status information corresponding to the unprocessed character code includes information in which the document size is set to "A4", the page aggregation is set to "2", the thickness of the character is set to "Increase", and the magnification is set to "100%". It is assumed that the second correction information includes information on the thickness-reduction correction.

If the electronic document includes a character corresponding to the unprocessed character code "CCC", when the document size is set to "A4", the thickness of the character is set to "Increase", and the magnification is set to "100%", it is not possible to set the page aggregation to "2".

Further, since the second correction information includes information about the thickness-reduction correction, even if the quality operation condition is set so that the thickness of the character is more than that of the quality operation condition in accordance with the second status information, the condition where a character corresponding to the unprocessed character code could be a non-matching character is satisfied. That is, in the above example, it is not possible to set the page aggregation to 2 or more. If the second correction information includes information about the thickness-reduction correction, the setting of the quality operation condition is restricted so that the thickness of the character is not less than that of the quality operation condition in accordance with the second status information.

If the second learning information does not include the second correction information, it is not possible to set the quality operation condition in accordance with the second status information.

When the driver setting screen 120 is displayed on the display 64, the quality operation condition is returned to the default state if being already set to correspond to the second status information or the like.

In the image forming apparatus 12 according to the third embodiment, if a corrected image is generated, the third character code group is extracted from the corrected image, and it is determined whether the first character code group matches the third character code group.

If the first character code group does not match the third character code group, it is determined whether each of the non-matching character codes included in the non-matching character code group is an unprocessed character code. Specifically, if a character code matching the non-matching character code included in the non-matching character code group is not included in the third character code group, the non-matching character code is determined to be an unprocessed character code. If an output image is set as a print image as a result of which the predetermined correction condition is not satisfied, all non-matching character codes included in the non-matching character code group are handled as unprocessed character codes.

If the non-matching character code group includes an unprocessed character code, the second learning information is generated according to the unprocessed character code and the latest print information. The second learning information is generated similarly to the first learning information, and therefore, a detailed description will be omitted.

If the thickness of the character is set to "Unchanged", and the quality operation condition is not set to satisfy the bold character condition, that is, the predetermined correction condition is not satisfied when the second learning information is generated, the generated second learning information does not include the second correction information.

In the third embodiment, upon being generated, the second learning information is transmitted to the information processing device 14 via the network 16. Upon receiving the second learning information, the information processing device 14 stores the second learning information in the storage 26, but if other second learning information is already stored, the second learning information is stored to be accumulated (learned).

Although not illustrated, the control program of the image forming apparatus 12 according to the third embodiment includes a fourth extraction program, an unprocessed character determination program, a second information generation program, and a transmission program.

The comparison program 202$k$ according to the third embodiment is also a program for comparing the first character code group and the third character code group. The match determination program 202$l$ according to the third embodiment is also a program for determining whether the compared first character code group and third character code group match.

The fourth extraction program is a program for extracting the third character code group from a corrected image if the corrected image is generated.

The unprocessed character determination program is a program for determining whether each of the non-matching character codes included in the non-matching character code group is an unprocessed character code if the first character code group does not match the third character code group.

The second information generation program is a program for generating the second learning information described below according to the unprocessed character code and the latest print information if the first character code group does not match the third character code group, and the correction condition is not satisfied.

The transmission program is a program for transmitting the generated second learning information to the information processing device 14.

Further, the data storage area 204 stores the third character code group data and the second learning data.

The third character code group data is data corresponding to the third character code group. The second learning data is data corresponding to the second learning information, and the second learning data includes data corresponding to the unprocessed character code, data corresponding to the second status information, and data corresponding to the second correction information. The second learning data need not include data corresponding to the second correction information.

Although not illustrated, the control program of the information processing device 14 according to the third embodiment includes a character search program, a setting determination program, a default setting program, a setting restriction program, an information reception determination program, and a second storage program.

The character search program is a program for searching a character corresponding to an unprocessed character code included in the electronic document.

The setting determination program is a program for determining whether the quality operation condition is set to satisfy the condition where the character corresponding to the unprocessed character code could be a non-matching character if the electronic document includes a character corresponding to the unprocessed character code.

The default setting program is a program for returning the quality operation condition to the default state when the quality operation condition is set to satisfy the condition where the character corresponding to the unprocessed character code could be a non-matching character.

The setting restriction program is a program for restricting the setting of the quality operation condition such that if the electronic document includes a character corresponding to the unprocessed character code, the condition where the character could be a non-matching character is not satisfied.

The information reception determination program is a program for determining whether the second learning information is received, and the second storage program is also a program for storing the received second learning information.

The data storage area 304 stores the second learning data. The second learning data is similar to the second learning data stored in the data storage area 204, and therefore, duplicated description will be omitted.

Figure 19:
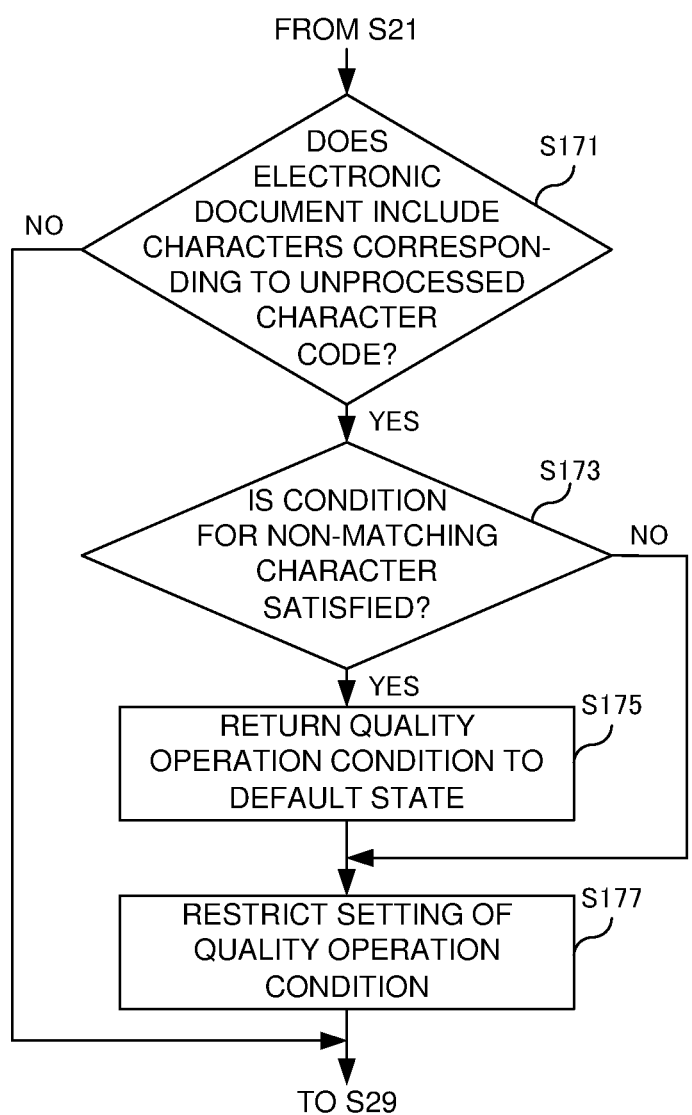
FIG. 19 is a flowchart illustrating a part of an example of a print instruction process of a CPU of an information processing device according to a third embodiment.

FIG. 19 is a flowchart illustrating an example of a process of the CPU 50 of the information processing device according to the third embodiment. The description duplicated with the first embodiment will be omitted, and only the changes from the first embodiment will be described.

In step S171, it is determined whether the electronic document includes a character corresponding to the unprocessed character code. If "NO" is determined in step S173, that is, if the electronic document does not include a character corresponding to the unprocessed character code, the processing proceeds to step S29 illustrated in FIG. 11. On the other hand, if "YES" is determined in step S171, that is, if the electronic document includes a character corresponding to the unprocessed character code, the processing proceeds to step S173.

In step S173, it is determined whether the condition where the character corresponding to the unprocessed character code could be a non-matching character is satisfied. Here, it is determined whether the quality operation condition is set in accordance with both the second status information and the second correction information, or in accordance with the second status information.

If "NO" is determined in step S175, that is, if the condition where the character corresponding to the unprocessed character code could be a non-matching character is not satisfied, the processing proceeds to step S177. On the other hand, if "YES" is determined in step S175, that is, if the condition where the character corresponding to the unprocessed character code could be a non-matching character is satisfied, then in step S175, the quality operation condition is returned to the default state, and the processing proceeds to step S177.

In step S177, the setting of the quality operation condition is restricted, and the processing proceeds to step S29 illustrated in FIG. 11.

Figure 20:
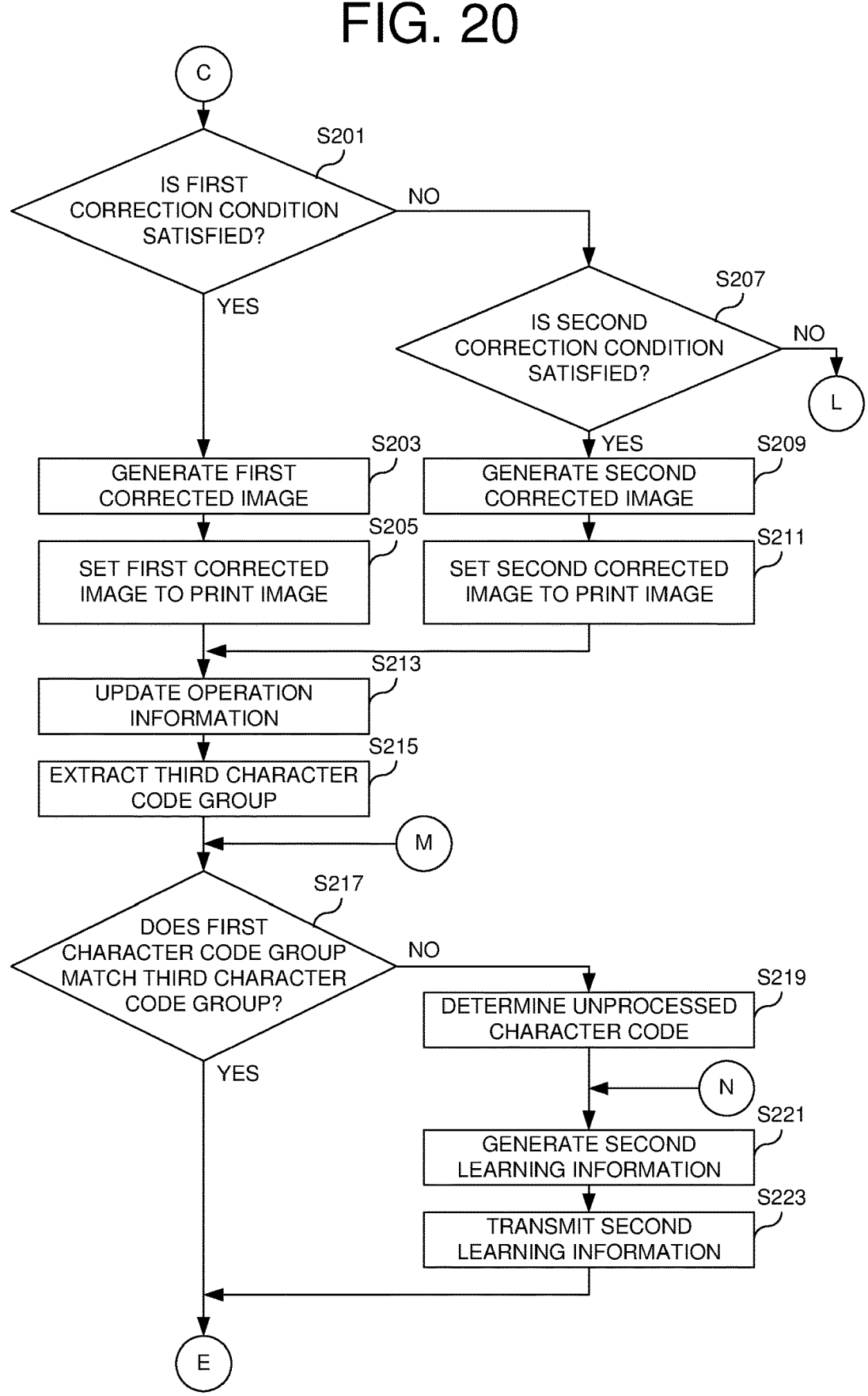
FIG. 20 is a flowchart illustrating a part of an example of a print process of the CPU of the image forming apparatus according to the third embodiment.
Figure 21:
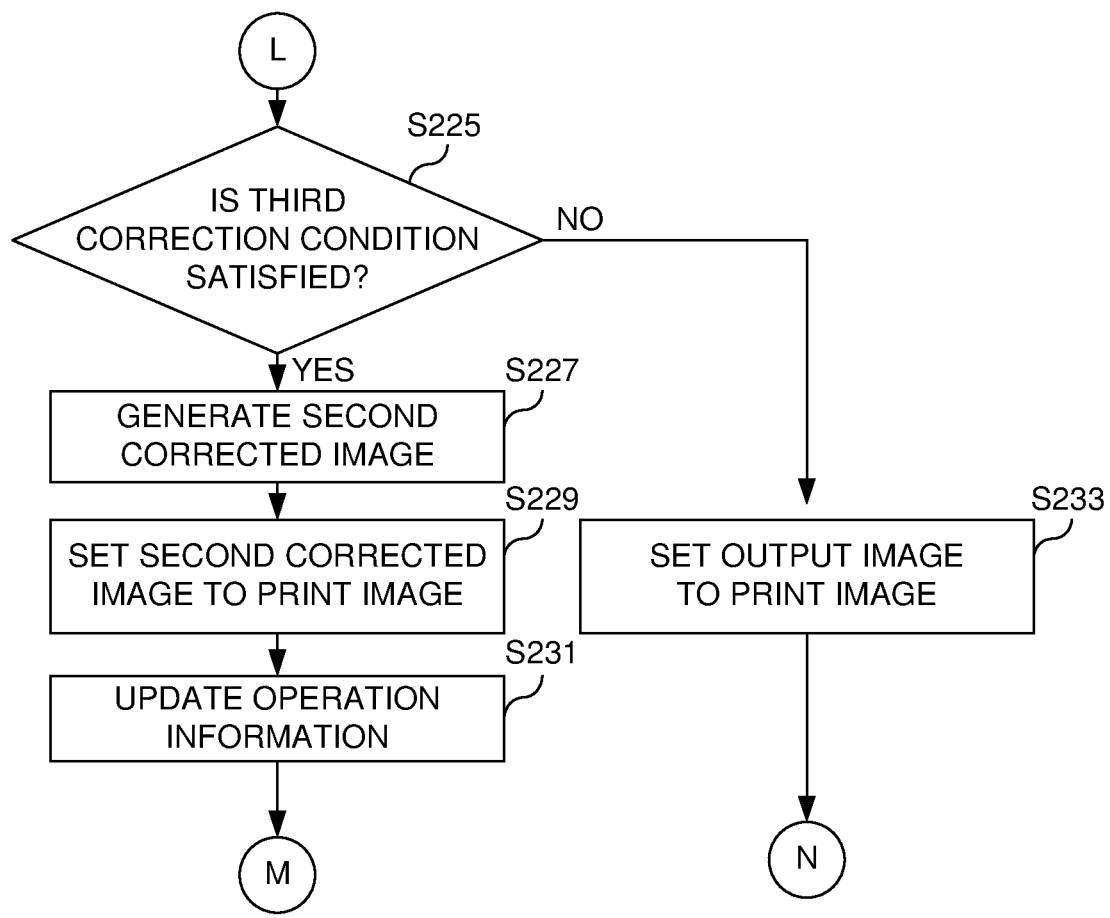
FIG. 21 is a flowchart subsequent to FIG. 20, illustrating another part of the example of the print process of the CPU of the image forming apparatus according to the third embodiment.

FIG. 20 and FIG. 21 are flowcharts illustrating a part of an example of the print process of the CPU 20 of the image forming apparatus 12 according to the third embodiment. Steps S201 to S213 correspond to steps S57 to S69 illustrated in FIG. 13, and therefore, duplicated description will be omitted.

In step S215, a third character code group is extracted from the corrected image, and in step S217, it is determined whether the first character code group matches the third character code group. If "NO" is determined in step S217, that is, if the first character code group does not match the third character code group, the processing proceeds to step S219. On the other hand, if "YES" is determined in step S217, that is, if the first character code group matches the third character code group, the processing proceeds to step S55 in FIG. 12.

In step S219, it is determined whether each of the non-matching character codes included in the non-matching character code group is an unprocessed character code, and in step S221, the second learning information is generated. In step S223, if the second learning information is transmitted to the information processing device 14, the processing proceeds to step S55 in FIG. 12.

Steps S225 to S233 illustrated in FIG. 21 correspond to steps S71 to S79 illustrated in FIG. 14, and therefore, duplicated description will be omitted.

Figure 22:
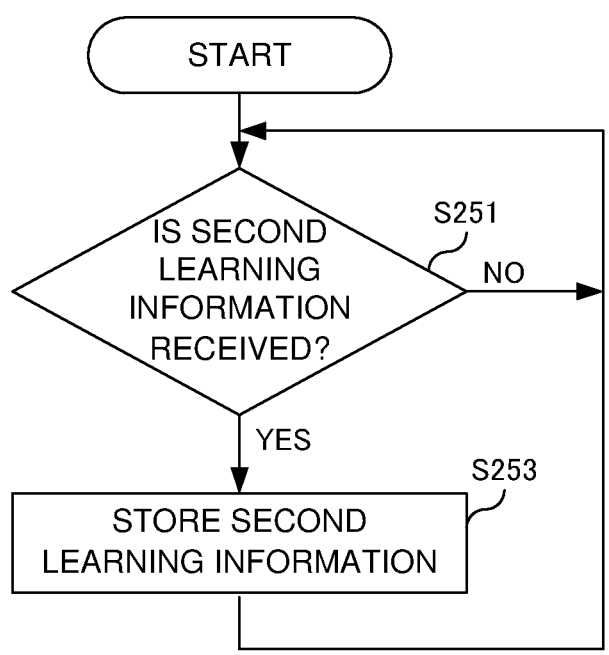
FIG. 22 is a flowchart illustrating an example of an information storage process of the CPU of the information processing device according to the third embodiment.

FIG. 22 is a flowchart illustrating an example of an information storage process of the CPU 50 of the information processing device 14 according to the third embodiment. In step S251, it is determined whether the second learning information is received. If "NO" is determined in step S251, that is, if the second learning information is not received, the processing returns to step S251. On the other hand, if "YES" is determined in step S251, that is, if the second learning information is received, then in step S253, the second learning information is stored in the storage 56, and the processing returns to step S251.

According to the third embodiment, the second learning information is stored in the storage 56 of the information processing device 14, and therefore, it is possible to restrict the setting of the quality operation condition according to the second learning information so that a non-matching character not corrected so that the character can be correctly recognized does not occur again. That is, it is possible to reduce in advance the possibility that the output image includes a non-matching character.

The contents of the second embodiment and the contents of the third embodiment may be used together. In the third embodiment, the setting of the quality operation condition is restricted so that a non-matching character not corrected so that the character can be correctly recognized does not occur again. In the second embodiment, it is possible to correct in advance a character corresponding to a non-matching character. In other words, if the contents of the second embodiment and the third embodiment are used together, a non-matching character that cannot be reliably corrected in an output image or the like does not occur, and if a character corresponding to a non-matching character processed in the past is included in the output image, it is possible to correct the character in advance. Therefore, a non-matching character is further prevented from occurring.

Further, each of the above-described embodiments is merely an example, and can be appropriately changed in an actual product. Also, the flowcharts illustrated in each of the above-described embodiments are merely examples, and the order of steps can be arbitrarily changed if the same effect is obtained.

DESCRIPTION OF REFERENCE NUMERALS

10: Information processing system
12: Image forming apparatus
14: Information processing device
16: Network
20: CPU
24: RAM
26: Storage
34: Communicator
50: CPU
54: RAM
56: Storage
62: Communicator
64: Display
66: Operation processor

What is claimed is:

1. An image forming apparatus, comprising:
a receiver that receives print information being transmitted from an external information processing device and including information on an electronic document including a plurality of characters;
a first image generator that generates an output image from the print information received by the receiver;
a first extractor that extracts, from the print information, a first character code group including a plurality of character codes for each of a plurality of characters included in the print information;
a second extractor that extracts, from the output image, a second character code group including a plurality of character codes for each of a plurality of characters included in the output image;
a first match determiner that determines whether the first character code group matches the second character code group;
a third extractor that, if the first character code group does not match the second character code group, extracts a non-matching character code group including a non-matching character code included in the first character code group;
a corrected image generator that, when the non-matching character code group is extracted, generates a corrected image in which a non-matching character corresponding to the non-matching character code is corrected based on the output image; and
an image former that prints the output image or the corrected image on a recording medium, wherein
the corrected image generator, increases a thickness of the non-matching character corresponding to the non-matching character code when a thickness of character is set to reduce as quality operation information included in the print information, and reduces the thickness of the non-matching character corresponding to the non-matching character code when the thickness of characters is set to increase as the quality operation information included in the print information or when page aggregation is set equal to or more than a predetermined number as the quality operation information included in the print information.

2. The image forming apparatus according to claim 1, wherein the quality operation information is information on operation conditions affecting a finish of characters printed on the recording medium.

3. The image forming apparatus according to claim 2, wherein the output image includes a first output image generated from the print information, and a second output image generated based on the first output image,
the image forming apparatus further includes: a first storage that, in the correction of the non-matching character, stores first learning information including a processed character code being a non-matching character code processed in past time;
a first processed character determiner that, when the first character code group is extracted, determines whether the first character code group includes the processed character code;
a non-matching condition determiner that, if the first character code group includes the processed character code, determines whether a condition where the character corresponding to the processed character code could be the non-matching character is satisfied; and
a third image generator that, if the condition where the character corresponding to the processed character code could be the non-matching character is satisfied according to the non-matching condition determiner, generates the second output image,
the second extractor extracts a second character code group from the second output image when the second output image is generated, and
the image former prints any one of the first output image, the second output image, and the corrected image on the recording medium.

4. The image forming apparatus according to claim 3, further comprising: a fourth extractor that extracts a third character code group from the corrected image;
a second match determiner that determines whether the first character code group matches the third character code group; and
a first information generator that, if the first character code group matches the third character code group, generates the first learning information.

5. The image forming apparatus according to claim 4, comprising: a second processed character determiner that, if the first character code group does not match the third character code group, determines whether the non-matching character code group includes the processed character code; and
the first information generator that, if the non-matching character code group includes the processed character code, generates the first learning information.

6. The image forming apparatus according to claim 2, comprising: a fourth extractor that extracts a third character code group from the corrected image;
a second match determiner that determines whether the first character code group matches the third character code group;
an unprocessed character determiner that determines whether the non-matching character code included in the non-matching character code group is an unprocessed character code being a non-matching character code not processed if the first character code group does not match the third character code group;
a second information generator that, if the non-matching character code included in the non-matching character code group is determined to be the unprocessed character code, generates second learning information; and a transmitter that transmits the second learning information to the external information processing device.

7. The image forming apparatus according to claim 6, wherein the second information generator generates second learning information corresponding to the non-matching character code group if a predetermined correction condition is not satisfied.

8. A non-transitory storage medium for storing an information processing program executed by an image forming apparatus including a receiver that receives print information being transmitted from an external information processing device and including information on an electronic document including a plurality of characters, and an image former that prints an output image or a corrected image on a recording medium, the information processing program for causing a processor of the image forming apparatus to execute:
generating the output image as a first image generation from the print information received by the receiver;
extracting, from the print information, a first character code group including a plurality of character codes for each of a plurality of characters included in the print information;
extracting, from the output image, a second character code group including a plurality of character codes for each of a plurality of characters included in the output image;
determining whether the first character code group matches the second character code group;
extracting, if the first character code group does not match the second character code group, a non-matching character code group including a non-matching character code included in the first character code group; and
generating, when the non-matching character code group is extracted, a corrected image in which a non-matching character corresponding to the non-matching character code is corrected based on the output image, wherein
a thickness of the non-matching character corresponding to the non-matching character code is increased when a thickness of character is set to reduce as quality operation information included in the print information, and the thickness of the non-matching character corresponding to the non-matching character code is reduced when the thickness of characters is set to increase as the quality operation information included in the print information or when page aggregation is set equal to or more than a predetermined number as the quality operation information included in the print information.

9. A method of processing information by an image forming apparatus including a receiver that receives print information being transmitted from an external information processing device and including information on an electronic document including a plurality of characters, and an image former that prints an output image or a corrected image on a recording medium, the method comprising:
generating the output image as a first image generation from the print information received by the receiver;
extracting, from the print information, a first character code group including a plurality of character codes for each of a plurality of characters included in the print information;
extracting, from the output image, a second character code group including a plurality of character codes for each of a plurality of characters included in the output image;
determining whether the first character code group matches the second character code group;
extracting, if the first character code group does not match the second character code group, a non-matching character code group including a non-matching character code included in the first character code group; and
generating, when the non-matching character code group is extracted, a corrected image in which a non-matching character corresponding to the non-matching character code is corrected based on the output image, wherein
a thickness of the non-matching character corresponding to the non-matching character code is increased when a thickness of character is set to reduce as quality operation information included in the print information, and the thickness of the non-matching character corresponding to the non-matching character code is reduced when the thickness of characters is set to increase as the quality operation information included in the print information or when page aggregation is set equal to or more than a predetermined number as the quality operation information included in the print information.

* * * * *